(12) United States Patent
McDysan et al.

(10) Patent No.: US 9,001,671 B2
(45) Date of Patent: Apr. 7, 2015

(54) FEATURE PEER NETWORK REPRESENTATIONS AND SCALABLE FEATURE PEER NETWORK MANAGEMENT

(71) Applicant: Verizon Patent and Licensing Inc., Basking Ridge, NJ (US)

(72) Inventors: David E. McDysan, Great Falls, VA (US); Stevan H. Leiden, Norwood, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 189 days.

(21) Appl. No.: 13/653,975

(22) Filed: Oct. 17, 2012

(65) Prior Publication Data
US 2014/0105031 A1 Apr. 17, 2014

(51) Int. Cl.
*H04L 1/00* (2006.01)
*H04L 12/725* (2013.01)
*H04L 12/703* (2013.01)

(52) U.S. Cl.
CPC ............. *H04L 45/302* (2013.01); *H04L 45/28* (2013.01)

(58) Field of Classification Search
CPC ......... H04L 45/04; H04L 45/22; H04L 45/34; H04L 45/24; H04L 45/28; H04L 45/48; H04L 12/26; H04L 69/40; H04L 67/125; H04L 47/12; H04L 1/00; H04W 40/30; G06F 17/30958; G06F 17/30985; G06F 11/00
USPC .................. 370/228, 232, 242, 252; 709/223
See application file for complete search history.

(56) References Cited

U.S. PATENT DOCUMENTS

| | | | |
|---|---|---|---|
| 6,976,087 B1* | 12/2005 | Westfall et al. | 709/238 |
| 7,499,984 B2* | 3/2009 | Gutjahr | 709/219 |
| 2008/0049630 A1* | 2/2008 | Kozisek et al. | 370/250 |
| 2008/0052401 A1* | 2/2008 | Bugenhagen et al. | 709/227 |
| 2010/0034084 A1* | 2/2010 | Wang et al. | 370/232 |
| 2011/0161521 A1* | 6/2011 | Mcdysan et al. | 709/246 |
| 2011/0188384 A1* | 8/2011 | Ortega et al. | 370/252 |
| 2012/0182862 A1* | 7/2012 | Cirkovic | 370/220 |
| 2012/0320784 A1* | 12/2012 | Edwards et al. | 370/252 |
| 2013/0089100 A1* | 4/2013 | Zhao et al. | 370/395.5 |
| 2013/0336192 A1* | 12/2013 | Zhao et al. | 370/312 |

OTHER PUBLICATIONS

J. Kempf et al., "The Rise of the Middle and the Future of End-to-End: Reflections on the Evolution of the Internet Architecture", Network Working Group, IAB, Mar. 2004, 14 pages.

* cited by examiner

*Primary Examiner* — Andrew Chriss
*Assistant Examiner* — Rasha Fayed

(57) ABSTRACT

A device receives packets of an application flow, and inspects one or more of the packets of the application flow. The device determines, based on the inspection of the one or more packets, a service graph of feature peers for the packets of the application flow. The feature peers are associated with a network and the service graph includes an ordered set of the feature peers. The device creates a representation of the service graph. The representation includes an ordered set of feature elements that represent the feature peers of the service graph. The device provides the representation of the service graph to a controller device, and the controller device configures, based on the representation, the network with the service graph so that the packets of the application flow traverse the service graph.

22 Claims, 19 Drawing Sheets

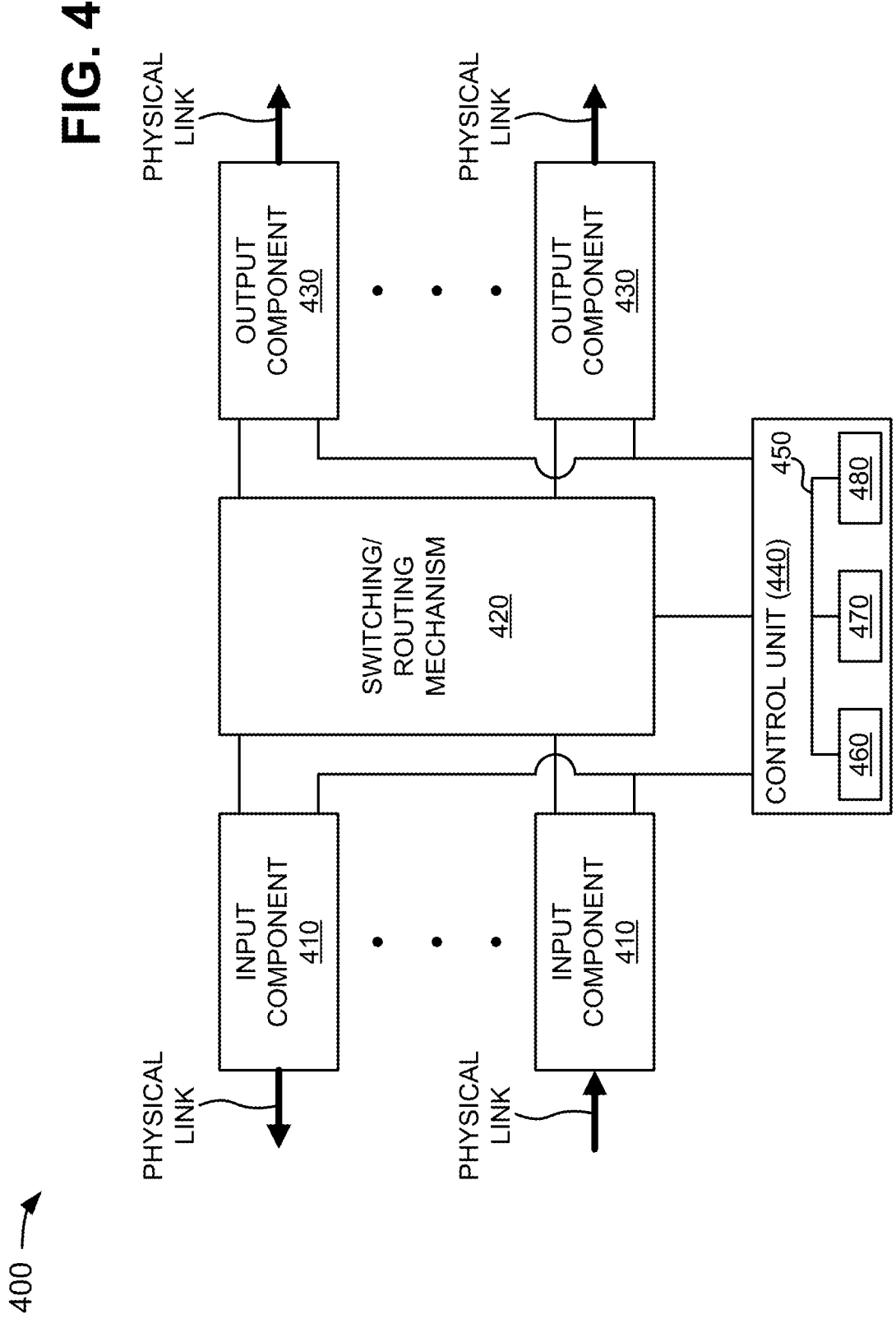

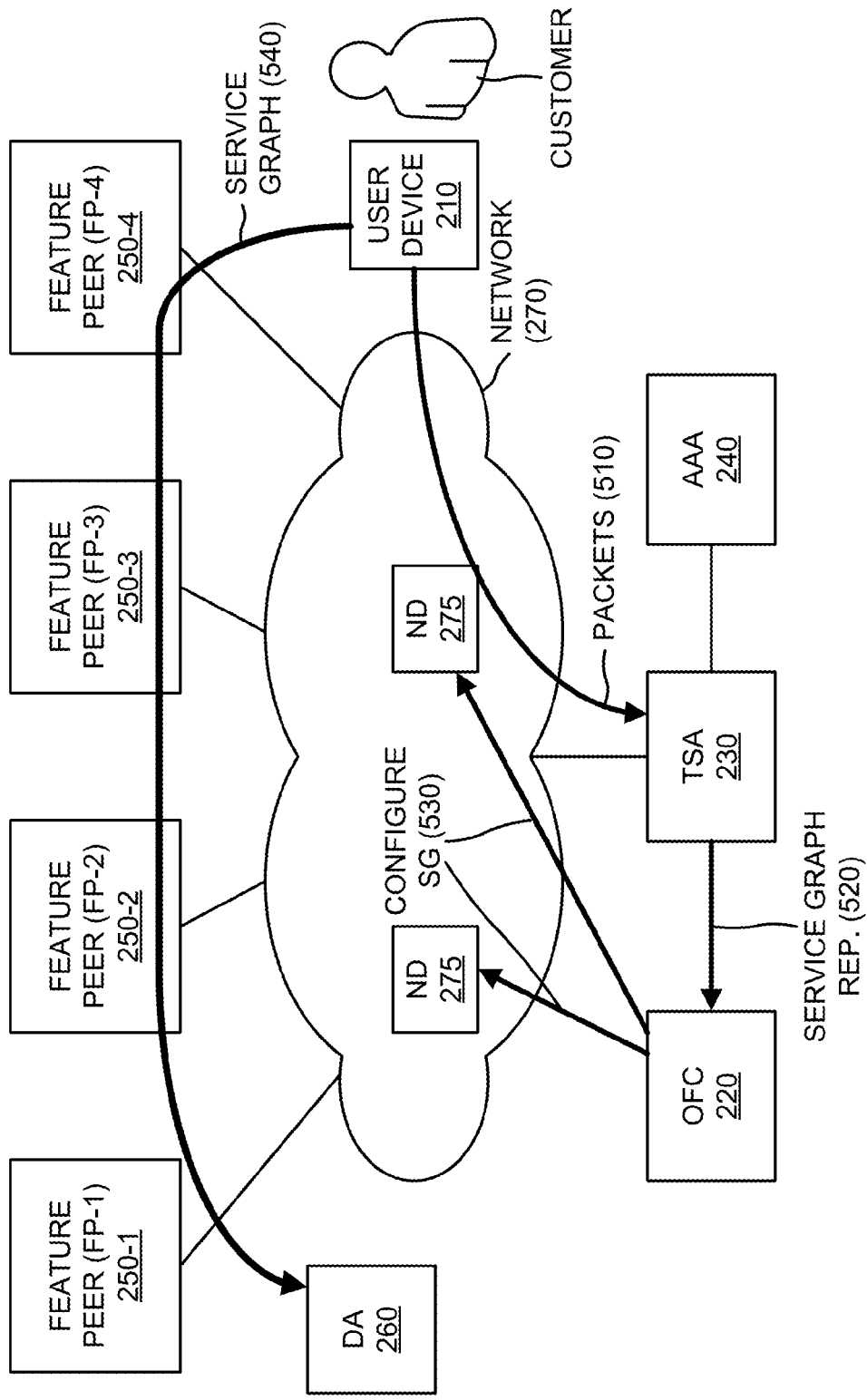

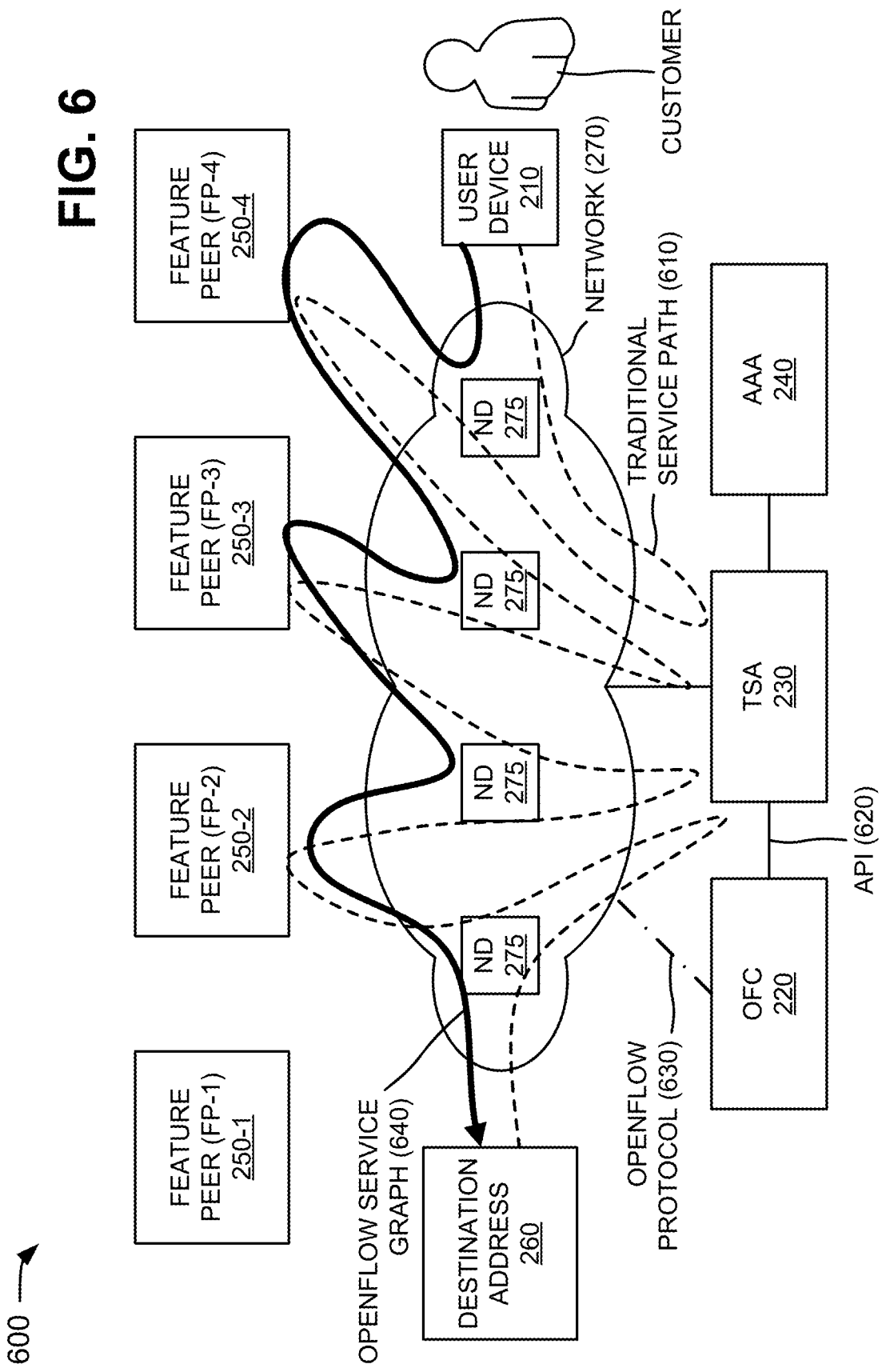

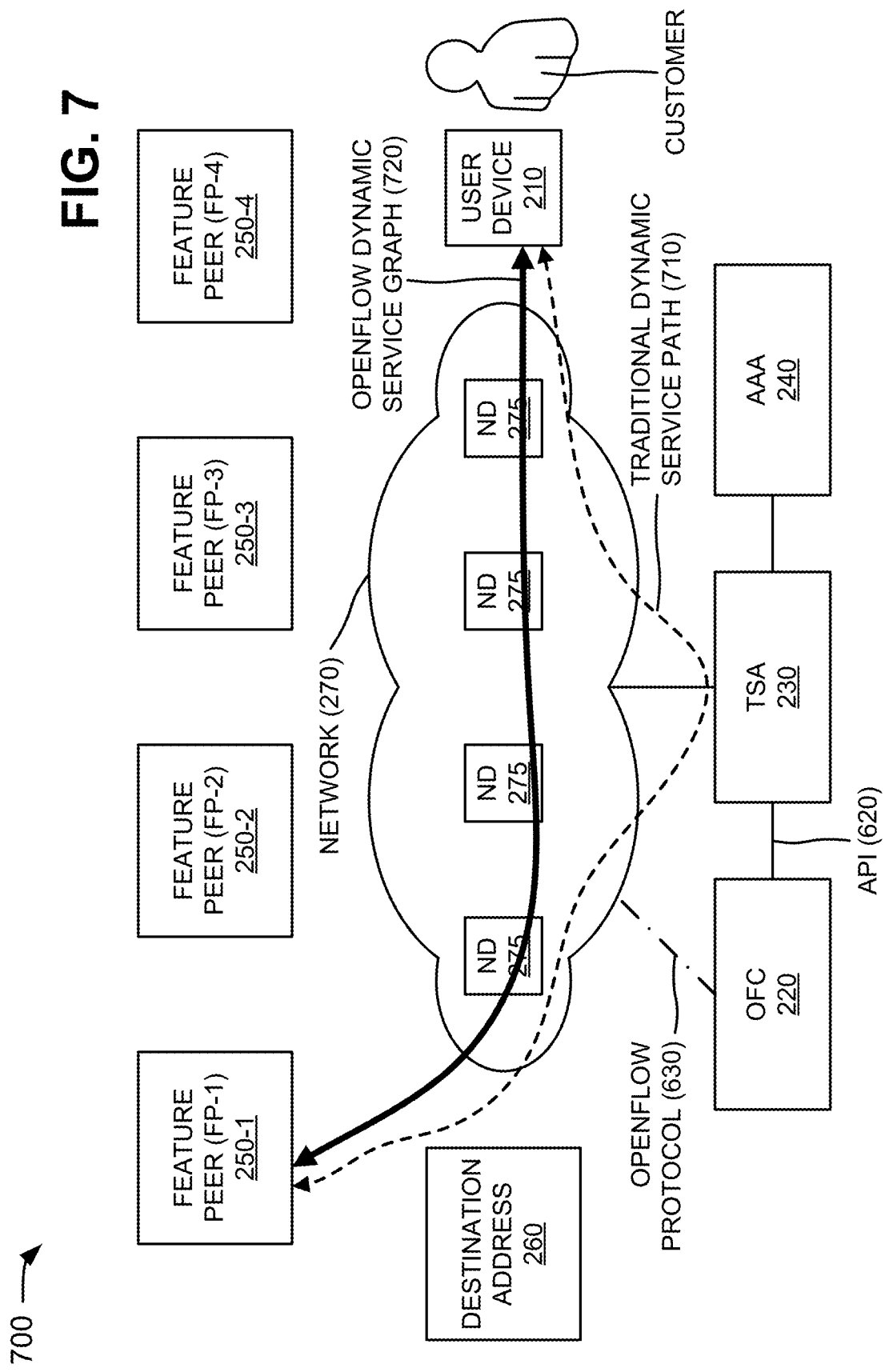

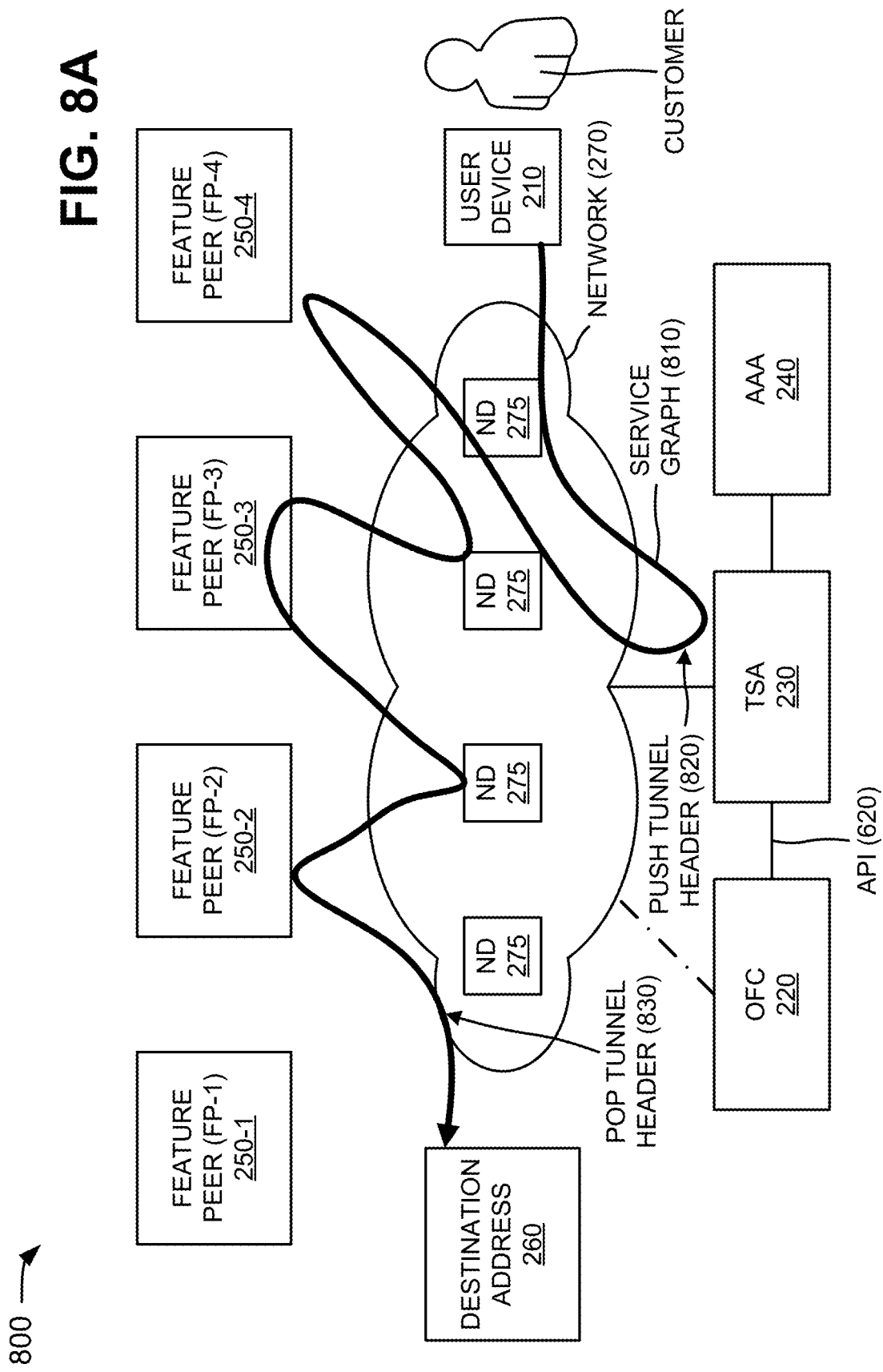

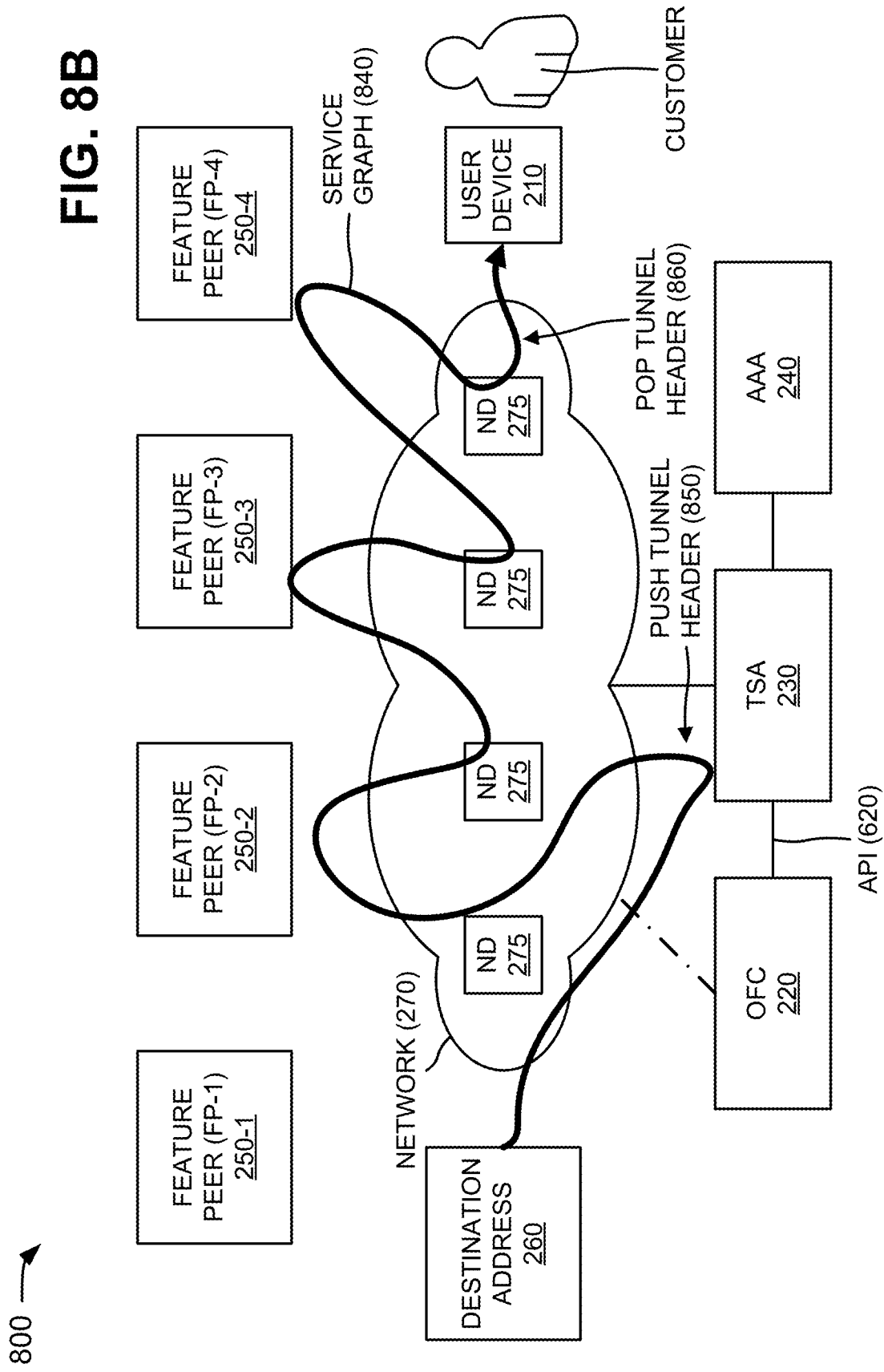

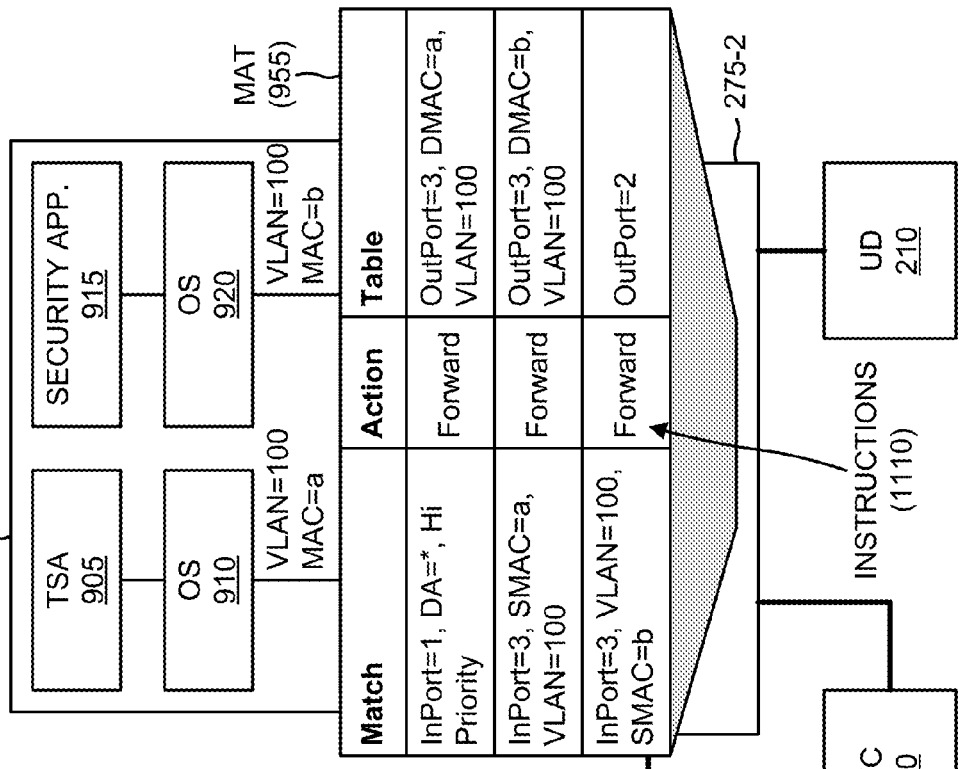
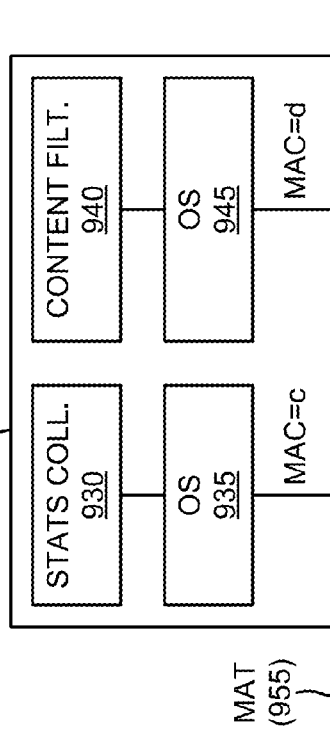
FIG. 11

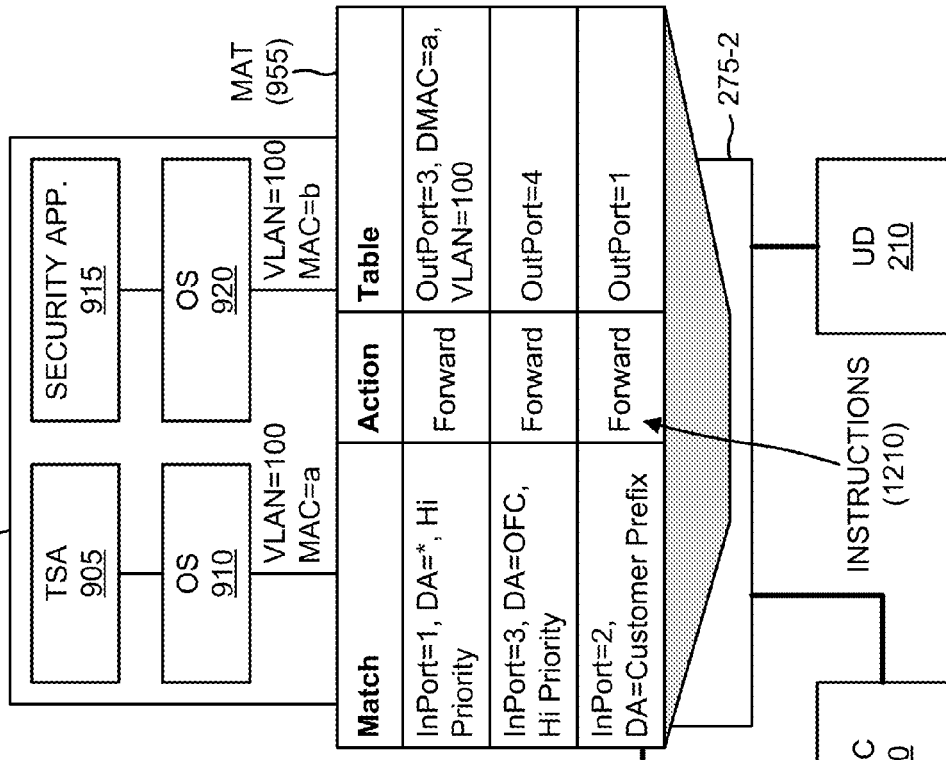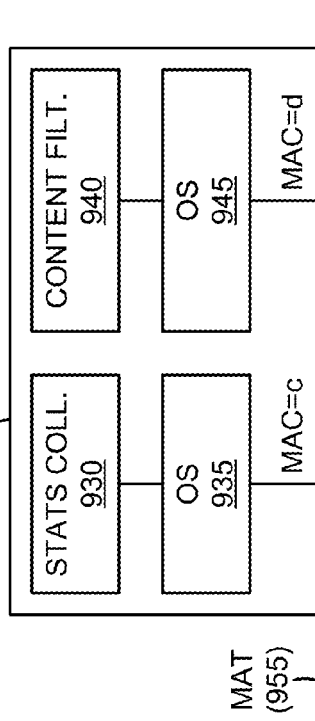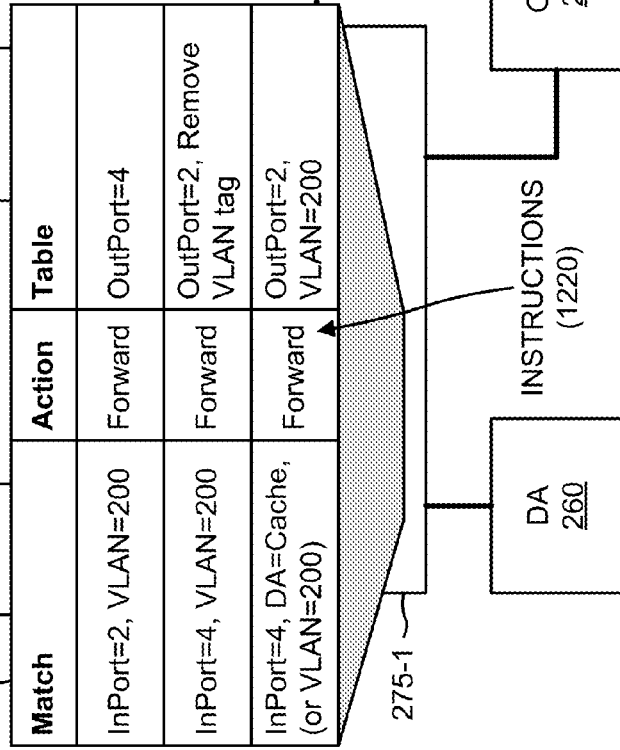
FIG. 12

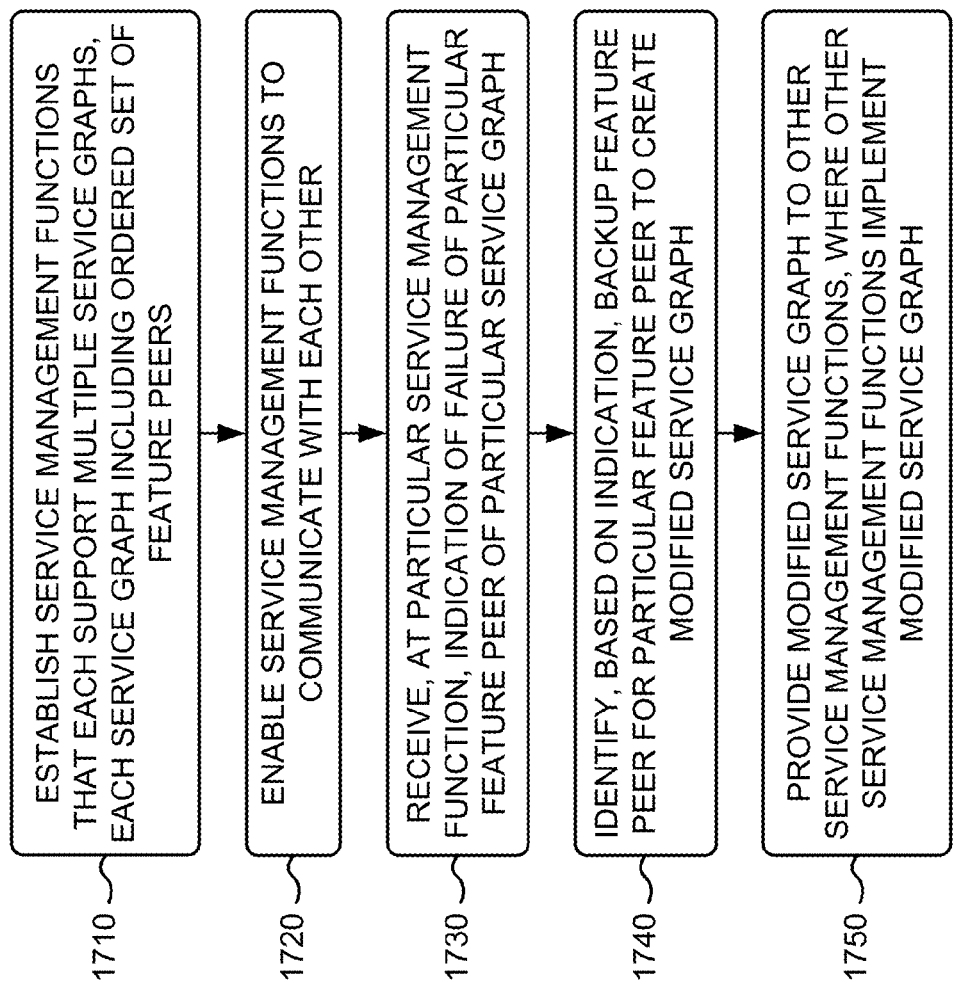

FEATURE PEER NETWORK REPRESENTATIONS AND SCALABLE FEATURE PEER NETWORK MANAGEMENT

BACKGROUND

Initially, a structure of services and/or features offered over networks (e.g., telecommunications networks, the Internet, etc.) was directly between real computing and/or storage hosts, in what is commonly called the edge-to-edge principle. The services/features were usually client-server, server-server, or client-client oriented.

Intermediate network nodes, provided in such networks, operated only at the Internet layer (e.g., routers) or the link layer (e.g., Ethernet switches) using either routing or bridging protocols. Some of these networking protocols were augmented to implement various forms of virtualization, such as virtual circuits and multiple access virtual private networks. These forms of network virtualization were achieved by adding header fields to packets, such as Internet protocol (IP) tunnel headers, multiprotocol label switching (MPLS) label stack headers, and/or extended Ethernet fields (e.g., virtual local area network (VLAN) tags), in conjunction with augmenting the routing and signaling protocols to distribute this information. This resulted in multiple logically separate, or virtual, networks, often referred to as Virtual Private Networks (VPNs).

Services/features provided by networking and computing resources are often implemented as overlays on networks (e.g., the Internet and/or VPNs). Furthermore, an enrichment of services has occurred, with the rise of middle-boxes, or feature peers, which operate above the Internet layer at the transport and/or application layers. The feature peers may include gateways provided between VPNs and the Internet, network address translation (NAT) devices, firewalls, intrusion detection devices, proxies of various forms, content filtering devices, caches, web acceleration devices, multimedia transcoding and statistics collection devices, etc. The feature peers, as part of service structures (i.e., feature networks), deviate from the original edge-to-edge principle, and require adherence to a different set of guiding principles to implement a reliable, traffic-engineered system that will achieve the goal of a converged service infrastructure.

Some networks provide packet and/or application flow services and/or features via one or more feature peers (i.e., middle boxes that communicate amongst themselves and not necessarily with a client or server). Examples of such packet/application flow services/features include content-related services (e.g., voice, audio, and/or video transcoding; multimedia conference bridging; replication; content filtering; content recognition; etc.); security-related services (e.g., network-based firewalls and/or application layer gateways; intrusion detection, prevention, and/or mitigation; denial of service detection, prevention, and/or mitigation; etc.); flow, rate, and quality of service (QoS)-related services (e.g., metering; policing; shaping; scheduling; coordination with higher-level signaling, policy, and configuration; caching; etc.); statistics collection and accounting-related services (e.g., usage cap metering, notification, and/or enforcement; billing; etc.); administrative-related services (e.g., selective packet set capture, replication, redirection, and/or blocking; packet inspection; etc.); proxy-related services where a feature peer acts on behalf of a client and/or server which is either (temporarily) off the network and/or in a failure/recovery state; etc.

Such packet/application flow services/features may be managed via a "star" or "flower" network centered on a feature switch. In the star/flower arrangement, traffic to/from a customer (e.g., of a service or feature) is directed into a set of feature peers by the feature switch. Such an arrangement may require configuration of the feature switch, use/configuration of tunnels, and configuration of load balancing, and may result in sub-optimal performance. The star/flower arrangement is expensive because, the feature switch (e.g., an access router, a load balancer, a tunnel gateway, or a traffic steering application (TSA) executing on a server), the routers and switches are traversed twice between each feature peer and the feature switch that connects to a customer and/or a router on the edge of a data center connected to the Internet and/or a virtual private network (VPN). In the star/flower arrangement, there needs to be a tunnel for each feature peer since a tunnel identification (ID) determines a next feature peer or an exit to a data network. Furthermore, the star/flower arrangement can increase latency if the feature peers are not near the feature switch that connects to the customer and the feature switch that connects to the feature peers. The star/flower arrangement requires a static configuration, in the feature switch, of tunnel IDs and next hops, and is resilient only if a dedicated replica of the feature peers is provisioned. If a dedicated replica of the feature peers is not provisioned, then reconfiguration is needed in response to failures (e.g., load balancing across the feature peers requires reconfiguration), and it is difficult to represent more complex feature topologies than a chain feature topology or is complex to implement dynamic feature networks, also referred to as service graphs.

Packet/application flow services/features may also be managed via a service header-based routing arrangement. In one example service header-based routing arrangement, a feature switch registers with a service broker, and the service broker provisions a table (e.g., of the feature switch) to map customer packets to a service routing function (e.g., associated with the feature switch). The service broker provisions service nodes with service header, tunnel, network, and subscriber information consistent with provisioning of the service routing function for the feature switch and/or edge router that connects to a destination of a customer in the network. The feature switch or edge router determines data network information, and receives a packet from a customer (e.g., from a device associated with the customer) or from the Internet/VPN. The access/edge router uses the table to determine that the packet includes subscribed to services and directs the packet to the service routing function. The service routing function uses local configuration and packet information to determine a service header to be inserted, encapsulates this within a tunnel header, and forwards the packet to a first service node over the tunnel. The service node decapsulates the packet from the tunnel, reviews the service header and configured information from the service broker to determine an outgoing tunnel, and forwards the packet to the next service node. Eventually, the packet returns to the access/edge router that originally received the packet. The service routing function decapsulates the packet from the tunnel, examines the service header, and determines that the next step is forwarding. The access/edge router then forwards the packet, via the data network, toward a destination address.

The service header-based routing arrangement requires expensive changes to the software and/or hardware of the access/edge router in order to implement the service header insertion and processing and to make it behave as a feature switch. The service header-based routing arrangement relies on a centralized service broker to determine, download, and monitor state, and to optimize and load balance service node level routing across a set of service nodes. Centralization may limit a convergence time and responsiveness to change associated with the arrangement. Furthermore, the service header-based routing arrangement requires fault detection and restoration performance to be determined by the centralized service broker, and may not be implemented across more than one service provider.

BRIEF DESCRIPTION OF THE DRAWINGS

FIG. 4 is a diagram of example components of a network device of FIG. 2;

FIGS. 5A and 5B are diagrams of example operations capable of being performed by an example portion of the environment of FIG. 2;

FIG. 6 is a diagram of example service chain operations capable of being performed by the environment illustrated in FIG. 2;

FIG. 7 is a diagram of example dynamic service chain operations capable of being performed by the environment depicted in FIG. 2;

FIGS. 8A and 8B are diagrams of example service chain tunneling operations capable of being performed by the environment of FIG. 2;

FIG. 11 is a diagram of example traffic steering packet flow operations capable of being performed by an example portion of the environment illustrated in FIG. 2;

FIG. 12 is a diagram of example transient packet flow operations capable of being performed by an example portion of the environment depicted in FIG. 2;

FIG. 17 is a flow chart of an example process for providing scalable management of a feature peer network.

DETAILED DESCRIPTION OF PREFERRED EMBODIMENTS

The following detailed description refers to the accompanying drawings. The same reference numbers in different drawings may identify the same or similar elements.

Systems and/or methods described herein may enable forwarding of packets of an application flow (e.g., traffic) between an ordered set of feature peers (e.g., the ordered set being referred to herein as a "service graph" and/or a "feature network") in a more efficient manner than traditional load balancer, access router, and/or traffic steering application methods. The systems and/or methods may determine the service graph of feature peers based on inspection of the packets, and may utilize a protocol (e.g., the Openflow protocol or other similar protocols) to configure network devices of a network with the service graph. The network devices may forward the packets of the application flow to the feature peers, based on the service graph and without changing the application flow. The systems and/or methods may create representations of the service graph, and may share state information, associated with the feature peers, with other feature peers so that a redundant or backup service graph may be created with the other feature peers.

The systems and/or methods may provide a one-to-N feature peer backup approach where a single feature peer may be a backup for N (N>1) feature peers. In the one-to-N feature peer backup approach, a pool of feature peers with high capacity access to resilient storage may be dynamically allocated by a service manager in response to feature peer and/or network failures in a more efficient manner than a one-to-one backup approach. In the 1-to-1 backup approach, network resources may be backed up in a one-to-one manner by redundant network resources.

Figure 1:
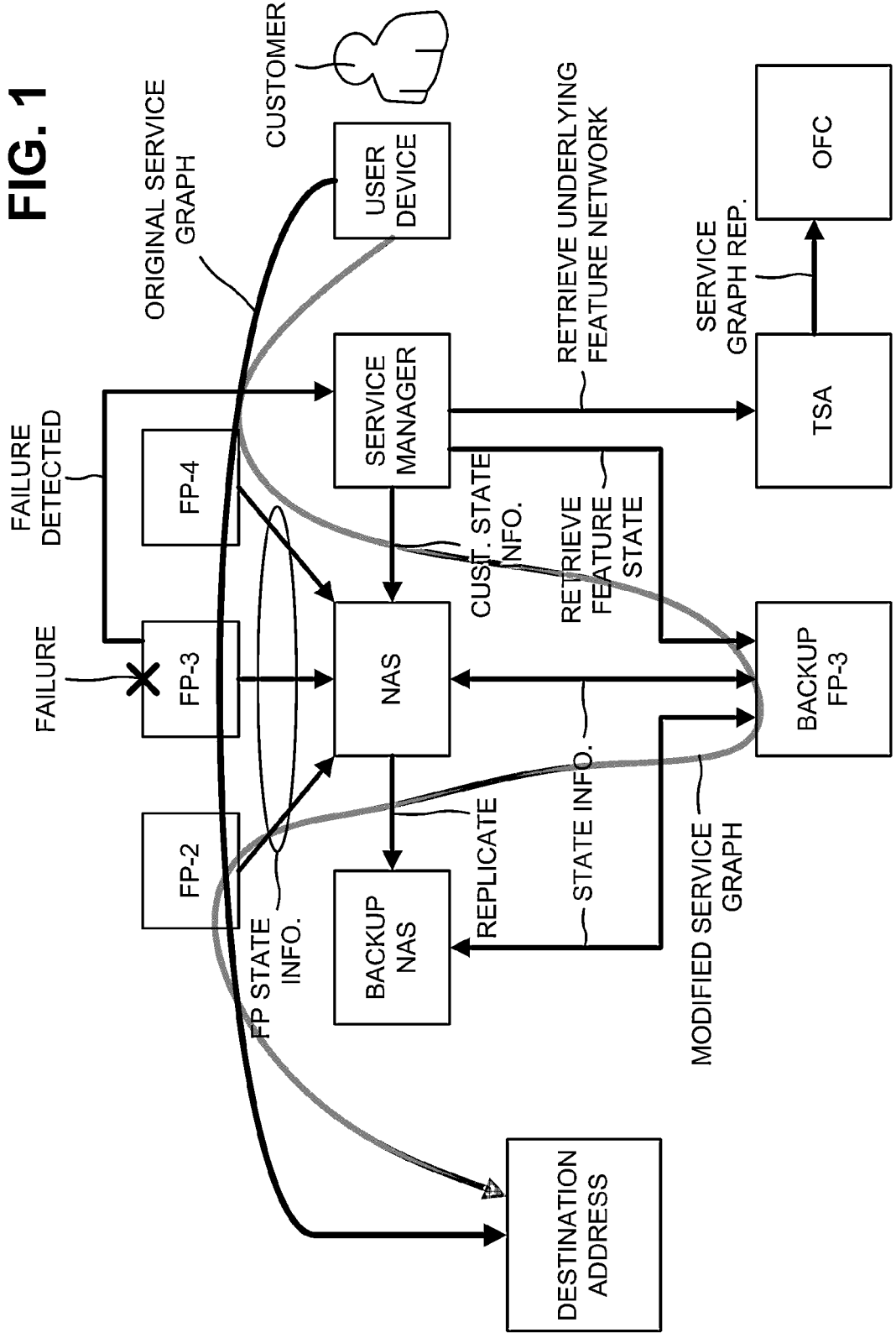
FIG. 1 is a diagram of an overview of an example implementation described herein.

FIG. 1 is a diagram of an overview of an example implementation described herein. As shown, a user device, an openflow controller (OFC), a traffic steering application (TSA), two sets of feature peers (a first set of FP-2 through FP-4 and a second set of backup FPs), a destination address device (e.g., for connection to the Internet of a VPN), a network attached storage (NAS), a backup NAS, and a service manager may be associated with one another.

The user device may include a radiotelephone, a personal communications system (PCS) terminal, a smart phone, a personal digital assistant (PDA), a laptop computer, a tablet computer, a personal computer, etc. The OFC may include one or more computation and communication devices that utilize a protocol (e.g., the Openflow protocol or other similar protocols) to configure the network devices with service graphs. The TSA may include one or more computation and communication devices that generate service graphs for directing packets through an ordered set of feature peers.

Each of the feature peers may include one or more computation and communication devices that provide packet/application flow services/features, such as content-related services, security-related services, flow, rate, and QoS-related services, statistics collection and accounting-related services, administrative-related services, etc. For example, a second feature peer (FP-2) may provide statistics collection-related services, a third feature peer (FP-3) may provide content filtering-related services, and a fourth feature peer (FP-4) may provide security-related services. The TSA may consult with an authentication, authorization, and accounting (AAA) device, or a similar device, to determine subscriber profiles, user identification, user location, etc. in order to identify a set of packets to be directed to a particular service graph.

The destination address device may include a computation and communication device that is a destination of packets provided by the user device. In one example, the destination address device may be provided in the Internet or a VPN. Each NAS may include a dynamic storage device and/or a static storage device that may store information and/or instructions for use by the feature peers; a magnetic and/or optical recording medium and its corresponding drive; a solid state drive; etc. The service manager may include a computation and communication device that controls operation of the NASs.

As further shown in FIG. 1, a customer, associated with the user device, may wish to provide a packet of an application flow to the destination address device for delivery to, for example, a network (e.g., the Internet, a VPN, etc.). A packet returned by the destination address device, and destined for the customer, may be processed in a similar manner in a reverse direction for the service graph, which may differ from the forward direction. In one example, the packets may need to traverse one or more of the feature peers before being provided to the destination address device. The TSA may inspect one or more of the packets of the application flow to determine a service graph for the packets of the application flow. The TSA may create a representation, of the service graph, that includes an ordered set of feature elements that represent the feature peers. The TSA may provide the service graph representation to the OFC, and the OFC may configure, based on the representation, a network with the service graph so that the packets of the application flow traverse the service graph. In one example, the service graph may cause the packets to traverse the fourth feature peer, the third feature peer, and the second feature peer before being provided to the destination address device.

As the packets of the application flow traverse the feature peers of the service graph, the feature peers may provide feature peer state information to the NAS. The feature peer state information may include information generated by the feature peers during the processing of the packets of the application flow. For example, the feature peer state information may include rules of content filtering applied to the packets of the application flow, blacklists (e.g., of blocked web sites), whitelists (e.g., of allowed web sites), content filters associated with the customer, signatures of web sites visited by the customer, Internet protocol (IP) addresses to block, encryption information, firewall parameters, etc. The NAS may receive and store the packets containing the feature peer state information.

As the packets of the application flow traverse the feature peers of the service graph, the service manager may receive customer state information from the user device. The service manager may provide the customer state information to the NAS. The customer state information may include information generated by the user device during the processing of the packets of the application flow. For example, the customer state information may include usernames and/or passwords associated with the customer, encryption information utilized by the customer, IP addresses utilized by the customer, customer account information, usage thresholds and/or usage rates associated with the customer, session states associated with the customer, a number of times the customer is blocked from a web site, etc. The NAS may receive and store the packets containing the customer state information.

The NAS may replicate, in the backup NAS, the feature peer state information and/or the customer state information. For example, the NAS may provide duplicates of the feature peer state information and/or the customer state information to the backup NAS. The backup NAS may receive and store the duplicates of the feature peer state information and/or the customer state information. The backup NAS may be utilized in the event that the NAS becomes unavailable and may perform the functions of the NAS described herein. Each active feature peer and each feature peer in the backup pool may have access to a resilient shared state repository implemented in the NAS and the backup NAS. The storage of the NAS may be organized and indexed by individual customer, a set of customers, a shared infrastructure (e.g., software image, software feature parameters, etc.) that is common across all customers, etc. The service manager may create and maintain the assignment of the NAS to feature peers supporting specific sets of customers. The service manager may create and maintain the configuration of resilient storage of state information in the NAS.

As further shown in FIG. 1, the third feature peer may experience a failure or may become partially or fully disabled. The service manager may detect the failure (e.g., via signaling or lack of signaling provided by the third feature peer). Based on the failure, the service manager may select a backup feature peer (e.g., backup FP-3) from a pool of backup feature peers, and may provide, to the backup feature peer, information (e.g., feature logic) that enables the backup feature peer to provide the features of the failed feature peer. The service manager may instruct the backup feature peer to retrieve state information, for the failed feature peer, from the NAS. Based on the instruction, the backup feature peer may retrieve the feature peer state information and/or the customer state information from the NAS or the backup NAS if the NAS is unavailable.

The service manager may instruct the TSA and the OFC to modify the original service graph to exclude the failed feature peer (e.g., the third feature peer) and to include the newly instantiated backup feature peer. The TSA may create a representation, of the modified service graph, that includes an ordered set of feature elements that represent the feature peers. The TSA may provide the modified service graph representation to the OFC, and the OFC may configure, based on the representation, the network with the modified service graph so that the packets of the application flow traverse the modified service graph. In one example, the modified service graph may cause the packets to traverse the fourth feature peer, the backup feature peer, and the second feature peer before being provided to the destination address device. When the third feature peer becomes available again, the original service graph may be reestablished and the utilized backup feature peer may become available for other feature peer failures.

The term "application flow," as used herein, is to be broadly construed to include a traffic flow of one or more packets. The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
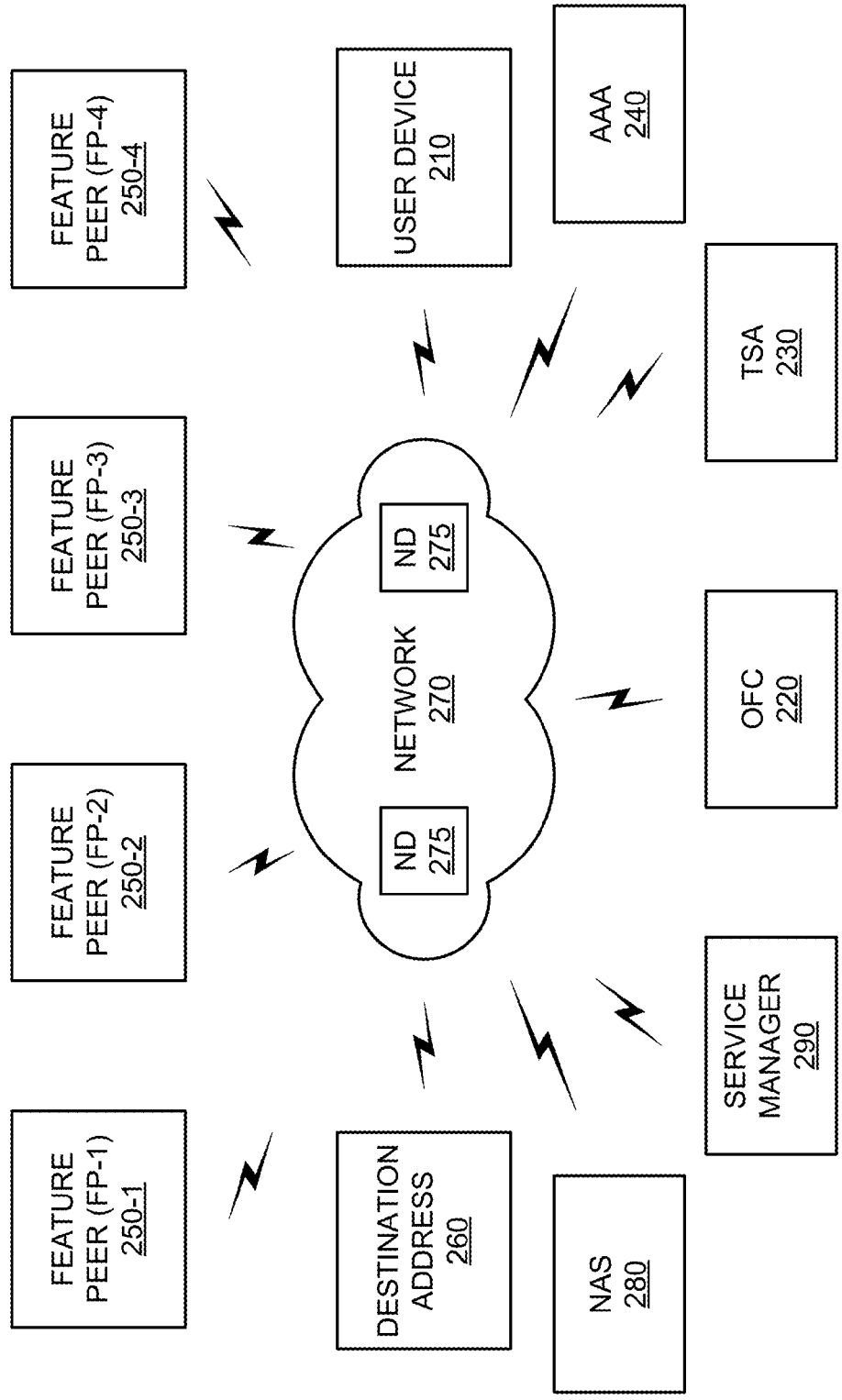
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210, an openflow controller (OFC) 220, a traffic steering application (TSA) 230, an authentication, authorization, and accounting (AAA) device 240 (referred to herein as "AAA 240"), feature peers 250-1 through 250-4 (collectively referred to herein as "feature peers 250," and, in some instances, singularly as feature peer 250), a destination address device 260, a network 270, network devices 275, a network attached storage (NAS) device 280 (referred to herein as "NAS 280"), and a service manager 290. Devices of environment 200 may interconnect via wired and/or wireless connections or links. A single user device 210, a single OFC 220, a single TSA 230, a single AAA 240, four feature peers 250, a single destination address device 260, a single network 270, two network devices 275, a single NAS 280, and a single service manager 290 have been illustrated in FIG. 2 for simplicity. In practice, there may be more user devices 210, OFCs 220, TSAs 230, AAAs 240, feature peers 250, destination address devices 260, networks 270, network devices 275, NASs 280, and/or service managers 290.

User device 210 may include a radiotelephone, a PCS terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer, a tablet computer, a personal computer, a landline telephone, or other types of computation and communication devices. In an example implementation, user device 210 may include a device that is capable of accessing features and/or services (e.g., content-related services; security-related services; flow, rate, and QoS-related services; accounting-related services; administrative-related services; etc.) provided by other components of environment 200.

OFC 220 may include one or more server devices, or other types of computation and communication devices, that gather, process, search, and/or provide information in a manner described herein. In one example implementation, OFC 220 may configure network devices 275 with service graphs (or feature peer networks) using a protocol, such as the Openflow protocol or other similar protocols. Each service graph may include instructions for forwarding packets to an ordered set of feature peers 250.

TSA 230 may include one or more server devices, or other types of computation and communication devices, that gather, process, search, and/or provide information in a manner described herein. In one example implementation, TSA 230 may monitor packets of an application flow and/or may consult information in AAA 240 to determine service graphs for the packets. TSA 230 may provide the determined service graphs to OFC 220 for provisioning network devices 275 with the service graphs. In one example, the functions of OFC 220 and TSA 230, described herein, may be combined in a single device or distributed among several devices. Alternatively, or additionally, the functions of TSA 230, described herein, may be performed by OFC 220.

AAA 240 may include one or more server devices, or other types of computation and communication devices, that gather, process, search, and/or provide information in a manner described herein. In an example implementation, AAA 240 may provide IP functionality to support authentication, authorization, and accounting functions. With regard to the authentication function, AAA 240 may verify a device's (e.g., user device's 210) specific digital identity provided via an identifier (e.g., a password, a digital certificate, a phone number, a user profile, customer subscription options, customer preferences, etc.) associated with the device or a set of devices (e.g., owned by a customer or a group of customers). With regard to the authorization function, AAA 240 may grant or refuse privileges to a device for accessing specific services (e.g., IP address filtering, address assignment, route assignment, QoS, etc.), for usage of particular service graphs, and for access to user-related information. With regard to the accounting function, AAA 240 may track consumption of network resources by customers (e.g., by user device 210) and may use this information for management, planning, billing, etc.

Feature peer 250 may include one or more server devices, or other types of computation and communication devices, that gather, process, search, and/or provide information in a manner described herein. In an example implementation, feature peer 250 may provide packet/application flow services/features, such as content-related services, security-related services, flow, rate, and QoS-related services, statistics collection and accounting-related services, administrative-related services, etc., as described above. For example, the first feature peer 250-1 may provide cache-related services, the second feature peer 250-2 may provide statistics collection-related services, the third feature peer 250-3 may provide content filtering-related services, and the fourth feature peer 250-4 may provide security-related services. Feature peers 250 may also communicate with each other using additional packets.

Destination address device 260 may include one or more server devices, or other types of computation and communication devices, that gather, process, search, and/or provide information in a manner described herein. In an example implementation, destination address device 260 may include a device that is a destination of packets provided by user device 210. In one example, destination address device 260 may include a network device (e.g., a router, a switch, etc.), an application server, etc. provided in the Internet or a VPN.

Network 270 may include a local area network (LAN), a wide area network (WAN), a metropolitan area network (MAN), a telephone network, such as the Public Switched Telephone Network (PSTN), an intranet, a packet-switched network, an optical fiber (or fiber optic)-based network, a television network, or a combination of networks.

Network device 275 may include one or more traffic transfer devices, such as a gateway, a router, a switch, a firewall, a load balancer, a NIC, a hub, a bridge, a proxy server, an OADM, or some other type of device that processes and/or transfers traffic (e.g., packets of an application flow). In one example implementation, network devices 275 may be configured with a service graph by OFC 220, and may collect statistics for use by OFC 220. The service graph may include instructions that cause network devices 275 to forward packets in a particular manner through environment 200. For example, the service graph may include instructions that cause network devices 275 to forward packets from user device 210 to the fourth feature peer 250-4, the third feature peer 250-3, the second feature peer 250-2, and finally to destination address device 260. The instructions may affect multiple related flows or a single flow. Instructions that affect multiple related flows may make environment 200 more scalable in parts that process a large aggregate of flows. Instructions that process individual or small sets of flows may be processed by user device 210, destination address device 260, and/or network devices 275 that support a larger number of individual flows.

NAS 280 may include a RAM or another type of dynamic storage device that may store information and instructions for use by feature peers 250; a ROM device or another type of static storage device that may store static information and/or instructions for use by feature peers 250; a magnetic and/or optical recording medium and its corresponding drive; etc. In one example, NAS 280 may store information associated with features/services offered by feature peer 250, service graphs, packet forwarding instructions, state information, etc.

Service manager 290 may include a computation and communication device that controls operation of TSA 230 and/or one or more NASs 280. In one example, service manager 290 may communicate with and receive information associated with user device 210. Alternatively, or additionally, the functions of service manager 290, described herein, may be performed by TSA 230.

Although FIG. 2 shows example devices of environment 200, in other implementations, environment 200 may include fewer devices, different devices, differently arranged devices, or additional devices than depicted in FIG. 2. Alternatively, or additionally, one or more devices of environment 200 may perform one or more tasks described as being performed by one or more other devices of environment 200.

Figure 3:
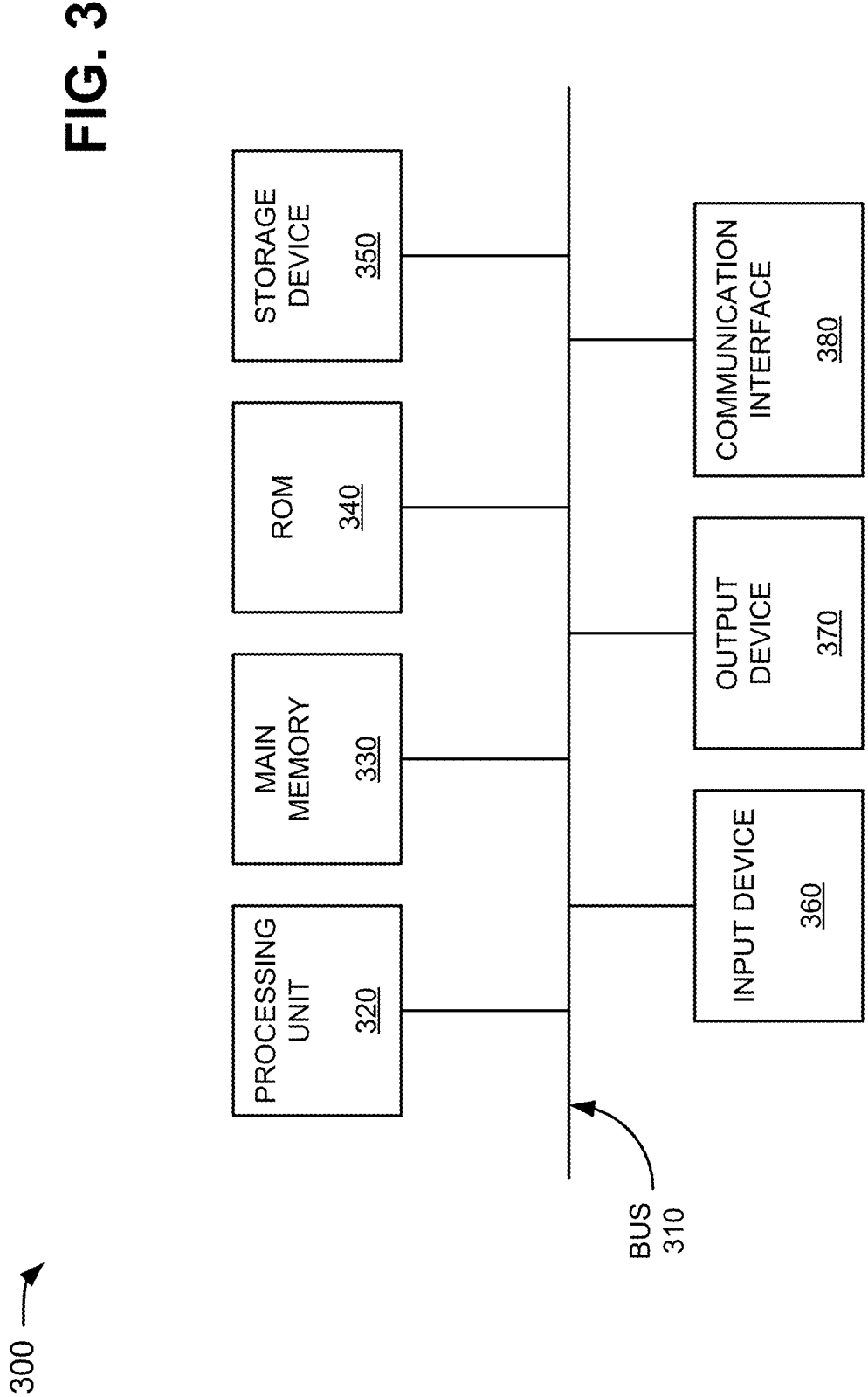
FIG. 3 is a diagram of example components of one or more devices of the environment depicted in FIG. 2.

FIG. 3 is a diagram of example components of a device 300 that may correspond to one or more devices of environment 200. In one example implementation, one or more of the devices of environment 200 may include one or more devices 300 or one or more components of device 300. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive. In one example implementation, processing unit 320, main memory 330, ROM 340, and/or storage device 350 may be dedicated hardware and/or may be implemented as virtual instances via a virtual machine manager (VMM) (e.g., a hypervisor).

Input device 360 may include a mechanism that permits an operator to input information to device 300, such as a keyboard, a mouse, a pen, a microphone, voice recognition and/or biometric mechanisms, etc. Output device 370 may include a mechanism that outputs information to the operator, including a display, a printer, a speaker, etc. Communication interface 380 may include any transceiver-like mechanism that enables device 300 to communicate with other devices and/or systems, and/or may perform switching functions (e.g., under the control of OFC 220). For example, communication interface 380 may include mechanisms for communicating with another device or system via a network. Communication interface 380 may be dedicated hardware and/or virtually provided by a VMM implemented in a guest operating system and/or an application.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

FIG. 4 is a diagram of example components of a device 400 that may correspond to network device 275 (FIG. 2). In one example implementation, network device 275 may include one or more devices 400 or one or more components of device 400. As shown in FIG. 4, device 400 may include input components 410, a switching/routing mechanism 420, output components 430, and a control unit 440.

Input components 410 may be a point of attachment for physical links and may be a point of entry for incoming traffic, such as packets. Input components 410 may process incoming traffic, such as by performing data link layer encapsulation or decapsulation, matching on specific sets of packet header fields, taking certain actions, implementing a table of functions, etc. In an example implementation, input components 410 may send and/or receive packets.

Switching/routing mechanism 420 may interconnect input components 410 with output components 430. Switching/routing mechanism 420 may be implemented using many different techniques. For example, switching/routing mechanism 420 may be implemented via busses, via crossbars, and/or with shared memories. The shared memories may act as temporary buffers to store traffic from input components 410 before the traffic is eventually scheduled for delivery to output components 430.

Output components 430 may store packets and may schedule packets for service on output physical links. Output components 430 may include scheduling algorithms that support priorities and guarantees. Output components 430 may support data link layer encapsulation and decapsulation, and/or a variety of higher-level protocols. In an example implementation, output components 430 may send packets, receive packets, match on specific sets of packet header fields, take certain actions, implement a table of functions, etc.

Control unit 440 may use routing protocols and one or more forwarding tables for forwarding packets. Control unit 440 may connect with input components 410, switching/routing mechanism 420, and output components 430. Control unit 440 may compute a forwarding table, implement routing protocols, and/or run software to configure and manage device 400. Control unit 440 may determine routing for any packet whose destination address may not be found in the forwarding table.

In an example implementation, control unit 440 may include a bus 450 that may include a path that permits communication among a processor 460, a memory 470, and a communication interface 480. Processor 460 may include one or more processors, microprocessors, ASICs, FPGAs, or other types of processing units that may interpret and execute instructions. Memory 470 may include a RAM, a ROM device, a magnetic and/or optical recording medium and its corresponding drive, and/or another type of static and/or dynamic storage device that may store information and instructions for execution by processor 460. Memory 470 may also temporarily store incoming traffic (e.g., a header of a packet, an entire packet, or a set of packets) from input components 410, for processing by processor 460, before a packet, or a set of packets, is directed back to switching/routing mechanism 420, transported by switching/routing mechanism 420, and eventually scheduled to be sent to output components 430. Communication interface 480 may include any transceiver-like mechanism that enables control unit 440 to communicate with other devices and/or systems (e.g., OFC 220).

As described herein, device 400 may perform certain operations in response to processor 460 executing software instructions contained in a computer-readable medium, such as memory 470. The software instructions may be read into memory 470 from another computer-readable medium, such as a data storage device, or from another device via communication interface 480. The software instructions contained in memory 470 may cause processor 460 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Alternatively, or additionally, one or more components of device 400 may perform one or more other tasks described as being performed by one or more other components of device 400.

Figure 5B:
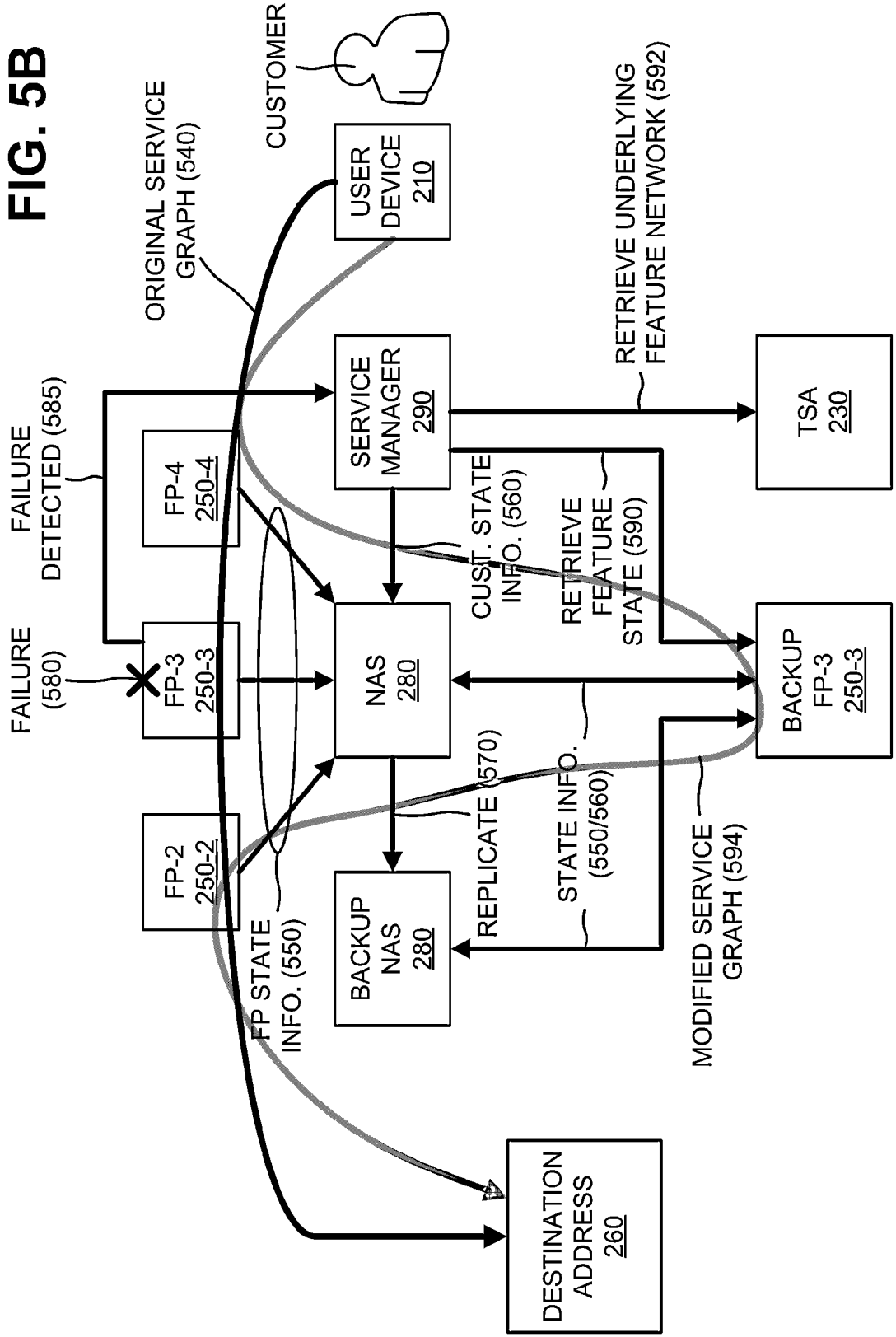

FIGS. 5A and 5B are diagrams of example operations capable of being performed by an example portion 500 of environment 200 (FIG. 2). As shown in FIGS. 5A and 5B, environment portion 500 may include user device 210, OFC 220, TSA 230, AAA 240, feature peers 250, destination address device 260, network 270, network devices (NDs) 275, NAS 280, a backup NAS 280, and service manager 290. User device 210, OFC 220, TSA 230, AAA 240, feature peers 250, destination address device 260, network 270, network devices 275, NASs 280, and service manager 290 may include the features described above in connection with one or more of, for example, FIGS. 1-4.

As shown in FIG. 5A, a customer, associated with user device 210, may wish to provide packets 510 of an application flow to destination address device 260 or another user device 210. In one example, packets 510 may need to traverse one or more feature peers 250 before being provided to destination address device 260. TSA 230 may consult with AAA 240 and/or may inspect one or more packets 510 of the application flow to determine a service graph for packets 510 of the application flow. In one example, the service graph may cause packets 510 to traverse the fourth feature peer 250-4, the third feature peer 250-3, and the second feature peer 250-2 before being provided to destination address device 260.

TSA 230 may create a representation 520, of the service graph, that includes an ordered set of feature elements that represent feature peers 250. The feature elements may include generic notations for feature peers (e.g., $f_{1,s}$, where the "1" may be a feature peer identifier and "s" may be a specific service graph "s"); packet ingress points (e.g., $i_s$, where "s" may be the specific service graph); packet egress points (e.g., $e_s$, where "s" may be the specific service graph); and data sources/sinks (e.g., $d_{1,s}$, where the "1" may be a data source identifier and "s" may be the specific service graph). In one example, feature elements that share a common feature peer identifier and/or data source identifier may be aggregated when feature peers 250 are assigned to a service graph.

In one example implementation, service graph representation 520 ($G_s$) may be provided in a set style format:

$$G_s = \begin{Bmatrix} (i_s, f_{1,s}, f_{2,s}, f_{5,s}, d_{2,s}), \\ (i_s, f_{1,s}, f_{2,s}, f_{3,s}, f_{4,s}, e_s), \\ (i_s, f_{1,s}, f_{2,s}, f_{3,s}, d_{1,s}, f_{6,s}, i_s), \\ (e_s, f_{1,s}, f_{2,s}, f_{5,s}, d_{2,s}), \\ (e_s, f_{1,s}, f_{2,s}, f_{4,s}, i_s) \end{Bmatrix},$$

where the example of service graph representation 520 may include five possible paths through a service graph. The set style format may be further manipulated into shorthand notation:

$$G_s = \left\{ \begin{matrix} (i_s, f_{1,s}, f_{2,s} \langle (f_{5,s}, d_{2,s}), f_{3,s}, \langle (f_{4,s}, e_s), (d_{1,s}, f_{6,s}, i_s) \rangle \rangle), \\ (e_s, f_{1,s}, f_{2,s} \langle (f_{5,s}, d_{2,s}), f_{4,s}, i_s \rangle) \end{matrix} \right\},$$

where elements enclosed in curly braces ("{ }") may denote a set, a comma (",") may denote concatenation, elements enclosed in parentheses ("( )") may denote association, and elements enclosed in angle braces ("< >") may denote alternation, broadcast, or sampling.

Branching (or alternation) may be encoded to reduce a length of the shorthand notation since repeated sub-paths in a full enumeration may be stated once. Branching may be important in dynamically monitoring and adjusting resources applied to implement a service graph since a fraction of traffic that utilizes a particular branch may not be specified. For example, a content filter logging rate and a cache hit rate may vary substantially even if a traffic volume between user device 210 and destination address device 260 is specified in a service level agreement.

Service graph representation 520 ($G_s$) may be represented as a set of $N_S$ service subgraphs (e.g., $G_S = \{g_{s,1}, \ldots, g_{s,Ns}\}$). Each service sub-graph (e.g., $g_{s,k}(P_k)$) may include an ordered set of feature elements $F_j$ (e.g., feature peers, links, ingress/egress points, data sources, etc.) that originate and/or terminate on a point or data that requires a profile ($P_k$), which may include a data structure (e.g., a vector, a matrix, or a set of objects) that describe characteristics of the service (e.g., bandwidth, storage volume, storage access rate, performance, availability objective, restoration, etc.) as defined by customer state information.

Provisioning a service graph may include mapping a service graph, that meets one or more objectives that are subject to a set of constraints (e.g., capacity, performance, etc.) of a set of all service graphs, onto a set of available resources with a particular profile (e.g., capacity, performance, availability, etc.). Network connectivity may include attributes and contexts that may vary because of where features are assigned to specific resources (e.g., feature peers 250). For example, if features are implemented in the same compute resource, then no external networking may be required since communication may be between virtual machines. For resources provided in the same Ethernet bridged domain, only network device 275 capacity that implements Ethernet bridging may be required. For resources provided in different bridged domains, network device 275 capacity that implements IP routing functions may be required. For resources connected via feature networking (e.g., in network device 275), network device 275 capacity may be required. Capacity may include constraints, such as an allowable number of table entries, a number of provisionable counters, a number of supportable keep-alive sessions, etc. Network device 275 may support other networking functions, such as VPNs, overlays, and/or interworking between different networking protocols.

As further shown in FIG. 5A, TSA 230 may provide service graph representation 520 to OFC 220, and OFC 220 may receive and store service graph representation 520. In one example implementation, OFC 220 may configure network devices 275 in network 270 to implement service graph representation 520, as indicated by reference number 530. For example, OFC 220 may generate and provide forwarding instructions to network devices 275. The forwarding instructions may include instructions that instruct network devices 275 to implement a service graph 540 based on service graph representation 520. Based on the forwarding instructions, network devices 275 may forward packets 510 of the application flow to the fourth feature peer 250-4, the third feature peer 250-3, the second feature peer 250-2, and finally to destination address device 260.

As shown in FIG. 5B, the customer, associated with user device 210, may wish to provide packets of an application flow to destination address device 260. The packets may need to traverse one or more of feature peers 250 before being provided to destination address device 260. An ordered set of feature peers 250 (e.g., service graph 540) may be provided for the packets of the application flow. In one example, service graph 540 may cause the packets to traverse the fourth feature peer 250-4, the third feature peer 250-3, and the second feature peer 250-2 before being provided to destination address device 260. Alternatively, or additionally, user device 210 may provide packets to another user device 210.

As the packets of the application flow traverse feature peers 250-2, 250-3, and 250-4 of service graph 540, feature peers 250-2, 250-3, and 250-4 may provide feature peer state information 550 to NAS 280. Feature peer state information 550 may include information generated by feature peers 250-2, 250-3, and 250-4 during the processing of the packets of the application flow. For example, feature peer state information 550 may include rules of content filtering applied to the packets of the application flow, blacklists (e.g., of blocked web sites), whitelists (e.g., of allowed web sites), content filters associated with the customer, signatures of web sites visited by the customer, IP addresses to block, encryption information, firewall parameters, etc. NAS 280 may receive and store feature peer state information 550.

As the packets of the application flow traverse feature peers 250-2, 250-3, and 250-4 of service graph 540, service manager 290 may receive customer state information 560 from user device 210. Service manager 290 may provide customer state information 560 to NAS 280. Customer state information 560 may include information generated by user device 210 during the processing of the packets of the application flow and/or from configuration of service specific parameters (e.g., updates to a generic black list, updates to generic white lists, security threat signatures, etc.). For example, customer state information 560 may include usernames and/or passwords associated with the customer, encryption information utilized by the customer, IP addresses utilized by the customer, customer account information, usage thresholds and/or usage rates associated with the customer, session states associated with the customer, a number of times the customer is blocked from a web site, etc. NAS 280 may receive and store customer state information 560 and such information may be retrieved periodically and/or pushed to feature peers 250 that provide a service requiring this state data.

NAS 280 may replicate, in backup NAS 280 and as indicated by reference number 570, feature peer state information 550 and/or customer state information 560. For example, the NAS 280 may provide duplicates of feature peer state information 550 and/or customer state information 560 to backup NAS 280. Backup NAS 280 may receive and store the duplicates of feature peer state information 550 and/or customer state information 560. Backup NAS 280 may be utilized in the event that NAS 280 becomes unavailable and may perform the functions of NAS 280 described herein. Each active feature peer 250 and each feature peer 250 in a backup pool may have access to a resilient shared state repository implemented in NAS 280 and backup NAS 280. The storage of NAS 280 may be organized and indexed by individual customer, a set of customers, a shared infrastructure (e.g., software image, software feature parameters, etc.) that is common across all customers, etc. Service manager 290 may create and maintain the assignment of NAS 280 to feature peers 250 supporting specific sets of customers. Service manager 290 may create and maintain the configuration of resilient storage of state information in NAS 280.

As further shown in FIG. 5B, the third feature peer 250-3 may experience a failure 580 or may become partially or fully disabled. Service manager 290 may detect the failure (e.g., via signaling or lack of signaling provided by the third feature peer), as indicated by reference number 585. Based on the failure 580, service manager 290 may select a backup feature peer (e.g., backup feature peer 250-3) from a pool of backup feature peers 250, and may provide, to backup feature peer 250-3, information (e.g., feature logic) that enables backup feature peer 250-3 to provide the features of the failed feature peer (e.g., the third feature peer 250-3). Service manager 290 may instruct backup feature peer 250-3 to retrieve state information, for the failed feature peer, from NAS, as indicated by reference number 590. Based on instruction 590, backup feature peer 250-3 may retrieve feature peer state information 550 and/or customer state information 560 from NAS 280 or backup NAS 280 if NAS 280 is unavailable.

Service manager 290 may instruct TSA 230 and OFC 220 to modify original service graph 540 to exclude the failed feature peer (e.g., the third feature peer 250-3) and to include the newly instantiated backup feature peer 250-3. TSA 230 may create a representation, of a modified service graph 594, that includes an ordered set of feature elements that represent the feature peers. TSA 230 may provide the modified service graph representation to OFC 220, and OFC 220 may configure, based on the representation, network 270 with modified service graph 594 so that the packets of the application flow traverse modified service graph 594. In one example, modified service graph 594 may cause the packets to traverse the fourth feature peer 250-4, the backup feature peer 250-3, and the second feature peer 250-2 before being provided to destination address device 260. When the third feature peer 250-3 becomes available again, original service graph 540 may be reestablished and the utilized backup feature peer 250-3 may become available for other feature peer failures.

Such an arrangement may ensure that user device 210 does not experience a service interruption despite a failure of one or more feature peers 250 in original service graph 540. For example, user device 210 may continue to send the packets of the application flow to destination address device 260, via modified service graph 594, without experiencing a service interruption. Alternatively, or additionally, such an arrangement may ensure that feature peer state information 550 and customer state information 560 may be backed up in a one-to-N (N≥1) manner, rather than a traditional one-to-one manner.

Alternatively, or additionally, when failure 580 is detected, failure 580 may be addressed by relocating feature state information 550 from one feature peer 250 to another feature peer 250, by adding a new feature peer 250, by retrieving feature state information 550 for the new feature peer 250, by mapping application flows from the failed feature peer 250 onto other feature peers 250, and/or by modifying the underlying network link connectivity.

Failure 580 may occur when one or more feature peers 250 and/or connectivity in one or more feature peers 250 are unavailable. Such unavailability may occur either because one or more feature peers 250 are inoperable, and/or a failure of either hardware or software occurs, within an infrastructure of network 270, that causes one or more feature peers 250 to be unreachable. An indication of failure 580 may be in the form of direct alarm information (e.g., a feature peer 250 heartbeat has timed out), an indication from a probe or a test session/flow that a service graph has failed, indirect alarm information (e.g., a pattern is identified as a failure of one or more feature peers 250 and/or network connectivity), etc.

In response to failure 580, NAS 280 may re-provision service graph 540 onto available feature peers 250 provided in the pool of feature peers. Alternatively, or additionally, NAS 280 may invoke session management to relocate certain user device 210 sessions to equivalent service graphs in response to failure 580 and/or performance degradations. The relocation may occur with restoration priority and/or specific performance objectives. Alternatively, or additionally, NAS 280 may instantiate a new service graph and/or attempt network link-level connectivity in response to failure 580. Alternatively, or additionally, NAS 280 may dynamically examine all impacted feature peers 250 within service graph 540. NAS 280 may locate alternate versions within service graph 540 of feature peers 250 and/or connectivity between a feature peer 250 and user device 210.

Although FIGS. 5A and 5B shows example components of environment portion 500, in other implementations, environment portion 500 may include fewer components, different components, differently arranged components, or additional components than depicted in FIGS. 5A and 513. Alternatively, or additionally, one or more components of environment portion 500 may perform one or more other tasks described as being performed by one or more other components of environment portion 500.

FIG. 6 is a diagram of example service chain operations 600 capable of being performed by environment 200 (FIG. 2). As shown in FIG. 6, environment 200 may include user device 210, OFC 220, TSA 230, AAA 240, feature peers 250, destination address device 260, network 270, and network devices 275. User device 210, OFC 220, TSA 230, AAA 240, feature peers 250, destination address device 260, network 270, and network devices 275 may include the features described above in connection with one or more of, for example, FIGS. 1-5.

As further shown in FIG. 6, a customer, associated with user device 210, may wish to provide packets of an application flow to destination address device 260. In one example, the packets may need to traverse one or more feature peers 250 before being provided to destination address device 260. In a traditional service chain implementation, the packets of the application may be directed through TSA 230, as shown by a traditional service path 610. In traditional service path 610, TSA 230 may direct the packets to features/services implemented on feature peers 250. In one example, traditional service path 610 may provide the packets from user device 210 to TSA 230, and TSA 230 may forward the packets to the fourth feature peer 250-4. The fourth feature peer 250-4 may process the packets (e.g., with features/services available at feature peer 250-4), and may provide the processed packets back to TSA 230. TSA 230 may forward the packets to the third feature peer 250-3. The third feature peer 250-3 may process the packets (e.g., with features/services available at feature peer 250-3), and may provide the processed packets back to TSA 230. TSA 230 may forward the packets to the second feature peer 250-2. The second feature peer 250-2 may process the packets (e.g., with features/services available at feature peer 250-2), and may provide the processed packets back to TSA 230. TSA 230 may then forward the packets to destination address device 260. Packets provided by destination address device 260, and destined for user device 210, may traverse traditional service path 610 in a reverse order or via another service path that may include the same feature peers, another set of feature peers, or the same set of feature peers in a different order.

Traditional service path 610 implementation may be expensive because multiple server interfaces, network device interfaces, and paths across network 270 must be traversed between TSA 230 and feature peers 250. Furthermore, configuration of TSA 230 for traditional service path 610 may be complex and error-prone and may support only a static service graph.

Another traditional approach may include providing application stitching points in TSA 230 between overlay paths, which may allow development of arbitrary service graphs that vary over time. Although such an approach may be flexible and extensible, packets may still traverse a significant number of interfaces (e.g., on servers, network devices, etc.), devices, and paths, which may not be required for all application flows. Furthermore, in some cases, TSA 230 may need to recognize specific customers and/or flows by interacting with AAA 240.

As further shown in FIG. 6, TSA 230 may communicate with OFC 220 via an application programming interface (API) 620. OFC 220 may communicate with and/or configure network devices 275 and/or virtual switching functions in feature peers 250 via a protocol, such as the Openflow protocol 630. That is, the network device switching and forwarding functionality of FIG. 4 may be implemented on a dedicated or virtualized server as described in FIG. 3. TSA 230 may receive packets of an application flow from user device 210, and may inspect one or more of the packets and/or may receive information from AAA 240. Based on the information received from AAA 240 (e.g., about the customer, the packets, the application flow, etc.) and/or the inspection of the one or more packets, TSA 230 may determine a service graph 640 for the packets of the application flow. In one example, service graph 640 may cause the packets to traverse the fourth feature peer 250-4, the third feature peer 250-3, and the second feature peer 250-2 before being provided to destination address device 260, TSA 230 may provide service graph 640 to OFC 220 via API 620.

OFC 220 may receive service graph 640, and may configure network devices 275 to implement service graph 640. For example, OFC 220 may provide, to network devices 275, instructions to implement service graph 640. The instructions may cause network devices 275 to forward packets, generated by user device 210 and/or destination address device 260, to one or more feature peers 250. For example, the instructions may instruct network devices 275 to forward packets from user device 210 to the fourth feature peer 250-4, the third feature peer 250-3, the second feature peer 250-2, and destination address device 260. Network devices 275 may implement service graph 640 without changing the application flow. Thus, as shown in FIG. 6, network devices 275 may forward the packets of the application flow to the fourth feature peer 250-4, the third feature peer 250-3, the second feature peer 250-2, and finally to destination address device 260. Configuring network devices 275 with service graph 640 may reduce costs since fewer interfaces may be traversed by packets traveling to/from user device 210 and/or destination address device 260.

Although FIG. 6 shows example components of environment 200, in other implementations, environment 200 may include fewer components, different components, differently arranged components, or additional components than depicted in FIG. 6. Alternatively, or additionally, one or more components of environment 200 may perform one or more other tasks described as being performed by one or more other components of environment 200.

FIG. 7 is a diagram of example dynamic service chain operations 700 capable of being performed by environment 200 (FIG. 2). As shown in FIG. 7, environment 200 may include user device 210, OFC 220, TSA 230, AAA 240, feature peers 250, destination address device 260, network 270, and network devices 275. User device 210, OFC 220, TSA 230, AAA 240, feature peers 250, destination address device 260, network 270, and network devices 275 may include the features described above in connection with one or more of, for example, FIGS. 1-6.

As further shown in FIG. 7, a customer, associated with user device 210, may wish to provide packets of an application flow to destination address device 260. In a traditional approach, TSA 230 may dynamically determine that the packets may be provided to a particular feature peer rather than to destination address device 260. For example, TSA 230 may determine that the packets may be provided to a closest cache server with available capacity (e.g., the first feature peer 250-1). TSA 230 may inspect the first packets and/or sample packets of the application flow, may consult with AAA 240, and/or may use other information to determine a traditional dynamic service path 710 for the packets. However, with traditional dynamic service path 710, the packets of the application flow must still traverse TSA 230. Such an arrangement may not achieve a lowest cost for implementing the service structure, and may require additional software development, such as statistics collection from the cache server. Alternatively, or additionally, a dynamic service path may be created by inserting a transcoder in line with packets being sent to the customer so that capabilities of user device 210 and the available bandwidth of the access network may be adjusted.

For application flows that occur frequently (e.g., long-lived application flows), it may be desirable to avoid the cost of traversing unnecessary feature peers 250, as well as TSA 230, for each packet of the flow. TSA 230 may receive the packets of the long-lived application flow from user device 210. TSA 230 may inspect the first packets and/or sample packets of the application flow, may consult AAA 240, and/or may use other information (e.g., information about a closest cache server with available capacity). Based on the information received from AAA 240 (e.g., about the customer, the packets, the application flow, etc.), the other information, and/or the inspection of the first/sample packets, TSA 230 may determine that the packets of the application flow need to be provided to the first feature peer 250-1 (e.g., a cache server or a transcoder). Based on this determination, TSA 230 may generate an openflow dynamic service graph 720 for the packets of the application flow. In one example, service graph 720 may cause the packets to traverse between user device 210 and the first feature peer 250-1. TSA 230 may provide service graph 720 to OFC 220 via API 620.

OFC 220 may receive service graph 720, and may configure network devices 275 to implement service graph 720. For example, OFC 220 may provide, to network devices 275, instructions to implement service graph 720. The instructions may cause network devices 275 to forward packets between user device 210 and the first feature peer 250-1. For example, the instructions may instruct network devices 275 to forward packets from user device 210 to the first feature peer 250-1, and may instruct network devices 275 to forward packets from the first feature peer 250-1 to user device 210. Thus, as shown in FIG. 7, network devices 275 may forward the subsequent packets of the application flow between user device 210 and the first feature peer 250-1. Service graph 720 may bypass unnecessary feature peers 250 (e.g., feature peers 250-2, 250-3, and 250-4), as well as TSA 230, which may reduce cost. OFC 220 may utilize time-out and/or polling of network devices 275 to detect an end of the long-lived application flow and/or to collect statistics.

Although FIG. 7 shows example components of environment 200, in other implementations, environment 200 may include fewer components, different components, differently arranged components, or additional components than depicted in FIG. 7. Alternatively, or additionally, one or more components of environment 200 may perform one or more other tasks described as being performed by one or more other components of environment 200.

FIGS. 8A and 8B are diagrams of example service chain tunneling operations 800 capable of being performed by environment 200 (FIG. 2). As shown in FIGS. 8A and 813B, environment 200 may include user device 210, OFC 220, TSA 230, AAA 240, feature peers 250, destination address device 260, network 270, and network devices 275. User device 210, OFC 220, TSA 230, AAA 240, feature peers 250, destination address device 260, network 270, and network devices 275 may include the features described above in connection with one or more of, for example, FIGS. 1-7.

Interfaces of an access network (e.g., wireline or wireless), associated with user device 210, and interfaces of a service network (e.g., Internet), associated with destination address device 260, may depend on the type of access network and whether the features/services provided by feature peers 250 have any state information (e.g., customer identification, connection type, flow type identification, etc.) related to customers. When feature peers 250 do not have customer state information, application flow entries may be configured to be proportional to a number of service graphs, a topology of a service graph, etc. When one or more feature peers 250 in a service graph include customer state information needed to process application flows, then a mapping of customer addresses may be made to feature peers 250 that include the customer state information. Additional packets, communicated between TSA 230 and feature peers 250 and/or directly communicated between feature peers 250, may be used where customer state information is needed. In one example, a feature peer 250 may act as a repository (e.g., a storage device shared across multiple feature peers 250) for providing customer state information to service graphs.

In a wireline access network the mapping of the customer addresses may be provided because blocks of customer addresses may be assigned to edge network devices 275 of network 270. The blocks of customer addresses may be used as prefix entries in the service graph to direct packets to feature peers 250 that contain the corresponding customer state. In such a scenario, service graph 640 (FIG. 6) may be used.

In a wireless access network, a customer may move between different cells (e.g., base stations), which may cause application flows associated with the customer to move between different interfaces on packet data network (PDN) gateways (PGWs). Furthermore, a customer may leave radio coverage and then return to radio coverage, and an application flow from the same customer may appear with a different IP address at the same PGW and potentially on the same interface. In such a scenario, TSA 230 may determine an identification of a customer (e.g., by intercepting a RADIUS or DIAMETER accounting message and/or a pilot packet), and may generate a service graph that directs packets to feature peers 250 that contain state information associated with the identified customer.

As shown in FIG. 8A, a customer, associated with user device 210, may wish to provide packets of an application flow to destination address device 260. TSA 230 may receive and inspect the packets of the application flow from user device 210, and may determine an identification of a customer (e.g., by intercepting a RADIUS or DIAMETER accounting message). Based on the identification of the customer and the inspection of the packets, TSA 230 may determine that the packets should be directed to feature peers 250 that contain state information associated with the identified customer. TSA 230 may consult with AAA 240 and/or may inspect some packets of the application flow to determine that the packets may require a tunnel (e.g., a set of stacked VLANs, a GRE tunnel with an embedded identifier, an MPLS label stack, an Ethernet PBB tag, and/or other packet fields used as a tunnel/feature header) to cause the packets to flow to feature peers 250 that include the customer state information. The tunnel header portion (e.g., a MAC address, a destination IP address of a GRE tunnel, or the uppermost label(s) in an MPLS label stack) may be used to direct packets to the next node(s) in the service graph while the feature header portion may be used by the feature itself (e.g., an inner and/or outer VLAN, a GRE tunnel key field, or an MPLS label deeper in the label stack). Based on this determination, TSA 230 may generate a service graph 810 for the packets of the application flow. In one example, service graph 810 may cause the packets to traverse TSA 230, the fourth feature peer 250-4, the third feature peer 250-3, and the second feature peer 250-2 before being provided to destination address device 260. TSA 230 may provide service graph 810 to OFC 220 via API 620.

OFC 220 may receive service graph 810, and may configure network devices 275 in network 270 to implement service graph 810. For example, OFC 220 may provide, to network devices 275, instructions to implement service graph 810. The instructions may cause network devices 275 to forward packets, generated by user device 210, to one or more feature peers 250. For example, the instructions may instruct network devices 275 to forward packets from user device 210 to TSA 230, the fourth feature peer 250-4, the third feature peer 250-3, the second feature peer 250-2, and destination address device 260.

TSA 230 may add (or push) tunnel/feature headers to the packets, as indicated by reference number 820, before providing the packets to the first network device 275 in service graph 810. Network devices 275 may implement service graph 810 by forwarding the packets of the application flow to the fourth feature peer 250-4, the third feature peer 250-3, the second feature peer 250-2, and finally to destination address device 260. The last network device 275 of service graph 810 may remove (or pop) the tunnel/feature headers from the packets, as indicated by reference number 830, before providing the packets to destination address device 260.

As shown in FIG. 8B, destination address device 260 may wish to provide packets of an application flow to user device 210. TSA 230 may receive and inspect the packets of the application flow from destination address device 260, and may determine an identification of a customer associated with user device 210. Based on the identification of the customer and the inspection of the packets, TSA 230 may determine that the packets should be directed to feature peers 250 that contain state information associated with the identified customer. TSA 230 may consult with AAA 240 and/or may inspect some packets of the application flow to determine that the packets may require a tunnel (e.g., a set of stacked VLANs, a GRE tunnel with an embedded identifier, an MPLS label stack, an Ethernet PBB tag, or other packet fields used as a tunnel/feature header) to cause the packets to flow to feature peers 250 that include the customer state information. Based on this determination, TSA 230 may generate a service graph 840 for the packets of the application flow. In one example, service graph 840 may cause the packets to traverse TSA 230, the second feature peer 250-2, the third feature peer 250-3, and the fourth feature peer 250-4 before being provided to user device 210. TSA 230 may provide service graph 840 to OFC 220 via API 620.

OFC 220 may receive service graph 840, and may configure network devices 275 in network 270 to implement service graph 840. For example, OFC 220 may provide, to network devices 275, instructions to implement service graph 840. The instructions may cause network devices 275 to forward packets, generated by destination address device 260, to one or more feature peers 250. For example, the instructions may instruct network devices 275 to forward packets from destination address device 260 to TSA 230, the second feature peer 250-2, the third feature peer 250-3, the fourth feature peer 250-4, and user device 210.

TSA 230 may add (or push) tunnel/feature headers to the packets, as indicated by reference number 850, before providing the packets to the first network device 275 in service graph 840. Network devices 275 may implement service graph 840 by forwarding the packets of the application flow to the second feature peer 250-2, the third feature peer 250-3, the fourth feature peer 250-4, and finally to user device 210. The last network device 275 of service graph 840 may remove (or pop) the tunnel/feature headers from the packets, as indicated by reference number 860, before providing the packets to user device 210.

Directing packets in such a manner may require use of a VLAN or a tunnel, as provided by TSA 230, which may cause the packets to flow through a service graph of feature peers 250 that contain the customer state information. Network devices 275 may push and pop a tunnel header on packets at each feature peer 250 in the service graph. The last network device 275 may pop the tunnel header before sending the packets to user device 210 and/or destination address device 260. The packet traversal of TSA 230 and the initial pushing of a tunnel header on the packets may occur at different points depending upon a direction of the packet flow, as illustrated in FIGS. 8A and 8B.

Although not as cost effective as service graph 640 shown in FIG. 6, the arrangement depicted in FIGS. 8A and 8B may be less expensive than having every packet traverse TSA 230, for each feature peer 250, as is the case in traditional approaches. Alternatively, or additionally, TSA 230 may generate one or more service graphs that include feature peers 250 with customer state information and feature peers 250 without customer state information. Alternatively, or additionally, customers may require that a service graph be reliable and recover rapidly from failures. Current TSA-based deployments often deploy a redundant set of feature peers 250 connected by ports in a one-to-one redundancy configuration. In an example implementation, feature peers 250 may share restoration feature peer 250 (e.g., for shared access to customer state information) where possible, with a goal being to achieve a one-to-N redundancy configuration.

Although FIGS. 8A and 8B show example components of environment 200, in other implementations, environment 200 may include fewer components, different components, differently arranged components, or additional components than depicted in FIGS. 8A and 8B. Alternatively, or additionally, one or more components of environment 200 may perform one or more other tasks described as being performed by one or more other components of environment 200.

Figure 9:
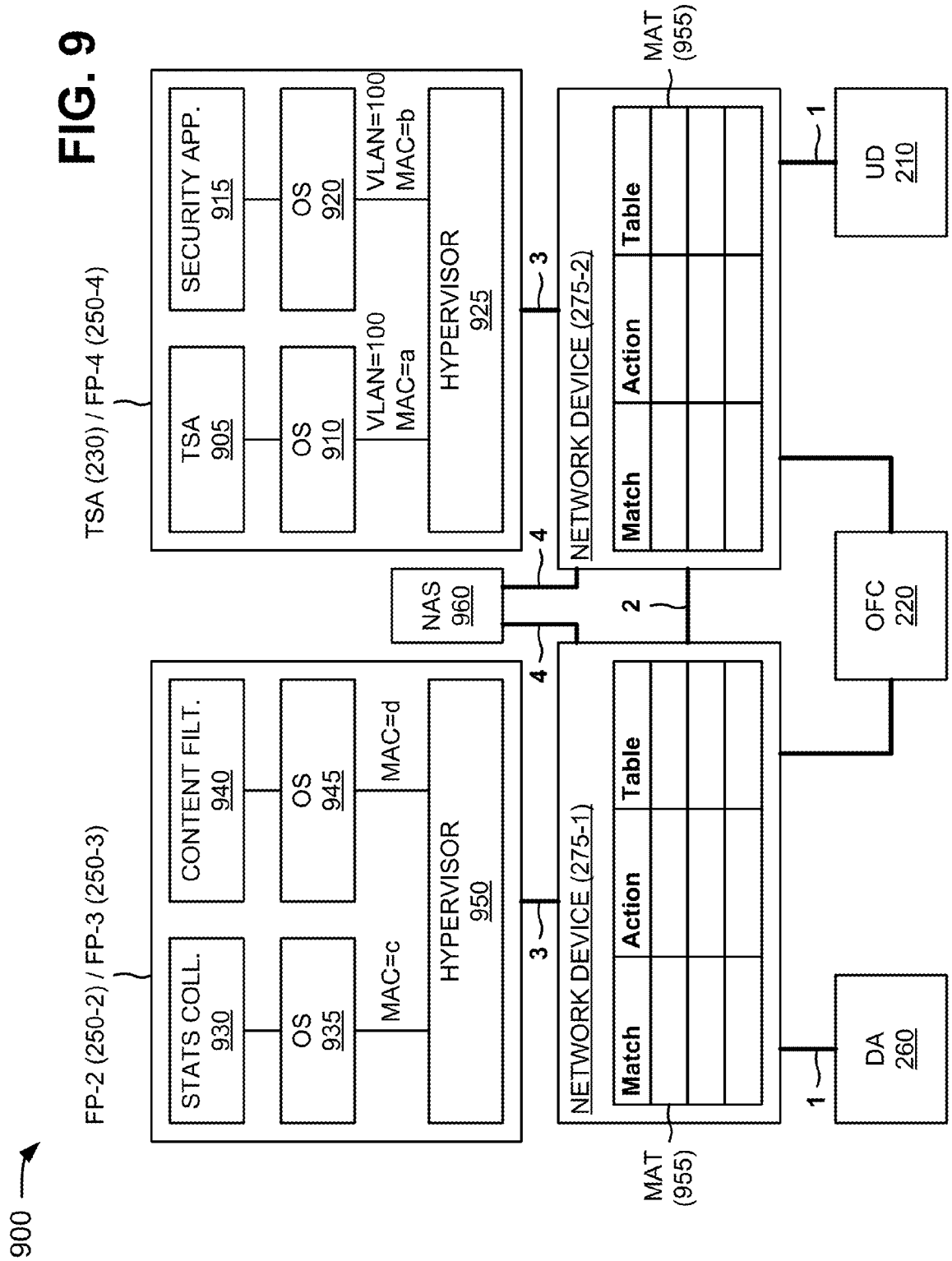
FIG. 9 is a diagram of example components of an example portion of the environment depicted in FIG. 2.

FIG. 9 is a diagram of example components of an example portion 900 of environment 200 (FIG. 2). As shown in FIG. 9, environment portion 900 may include user device (UD) 210, OFC 220, TSA 230, feature peers 250-2, 250-3, and 250-4, destination address device (DA) 260, and network devices 275-1 and 275-2. User device 210, OFC 220, TSA 230, feature peers 250-2, 250-3, and 250-4, destination address device 260, and network devices 275-1 and 275-2 may include the features described above in connection with one or more of, for example, FIGS. 1-813.

As further shown in FIG. 9, TSA 230 and feature peer 250-4 may be combined in a single device that includes a TSA 905, an operating system 910, a security application 915, an operating system 920, and a hypervisor 925. TSA 905 may include a traffic steering application that provides the functionality of TSA 230, as described herein. Operating system 910 may include a guest operating system, such as, for example, a Microsoft Windows Desktop operating system, a Microsoft Windows Server operating system, a Linux operating system, etc. Security application 915 may include an application that provides packet/application flow services/features (e.g., security-related services, such as intrusion detection/mitigation) associated with feature peer 250-4. Operating system 920 may include a guest operating system, such as, for example, a Microsoft Windows Desktop operating system, a Microsoft Windows Server operating system, a Linux operating system, etc. Hypervisor 925 may provide hardware and/or software virtualization techniques that allow multiple operating systems (e.g., "guest operating systems") to execute concurrently on a host computer. Hypervisor 925 may present to the guest operating systems a virtual operating platform that provides a compute environment described in connection with FIG. 3, and may manage the execution of the guest operating systems.

Feature peer 250-2 and feature peer 250-3 may be combined in a single device that, for example, includes a statistics collection application 930, an operating system 935, a content filtering application 940, an operating system 945, and a hypervisor 950. Statistics collection application 930 may include an application that provides packet/application flow services/features (e.g., statistics collection services) associated with feature peer 250-2. Operating system 935 may include a guest operating system, such as, for example, a Microsoft Windows Desktop operating system, a Microsoft Windows Server operating system, a Linux operating system, etc. Content filtering application 940 may include an application that provides packet/application flow services/features (e.g., content filtering-related services) associated with feature peer 250-3. Operating system 945 may include a guest operating system, such as, for example, a Microsoft Windows Desktop operating system, a Microsoft Windows Server operating system, a Linux operating system, etc. Hypervisor 950 may provide hardware virtualization techniques that allow multiple operating systems (e.g., "guest operating systems") to execute concurrently on a host computer. Hypervisor 950 may present to the guest operating systems a virtual operating platform, and may manage the execution of the guest operating systems.

As further shown in FIG. 9, network devices 275-1 and 275-2 may include ports that are numbered "1" to "4." Port 1 may connect network device 275-1 and destination address device 260, and may connect network device 275-2 and user device 210. Port 2 may connect network device 275-1 and network device 275-2. Port 3 may connect network device 275-1 and feature peers 250-2/250-3, and may connect network device 275-2 and TSA 230/feature peer 250-4. Port 4 may connect network devices 275-1 and 275-2 with other devices of network 270, such as a network attached storage (NAS) device 960 (e.g., a cache server). Network devices 275-1 and 275-2 may also connect to OFC 220. Address and VLAN information may be associated with TSA 230 and feature peers 250-2, 250-3, and 250-41. For example, a media access control (MAC) address (e.g., MAC=c) may be associated with feature peer 250-2, and a MAC address (e.g., MAC=d) may be associated with feature peer 250-3. A VLAN (e.g., VLAN=100) and a MAC address (e.g., MAC=a) may be associated with TSA 230, and a VLAN (e.g., VLAN=100) and a MAC address (e.g., MAC=b) may be associated with feature peer 250-4.

Network devices 275-1 and 275-2 may include a match action table (MAT) 955 that stores packet forwarding instructions associated with service graphs configured in network devices 275-1 and 275-2. MAT 955 may include a match field, an action field, and a table field. The match field may include information used to compare to information associated with a packet. For example, the match field may include entries for an incoming physical or logical port (InPort), a generalized description of an IP destination address (DA) or source address (SA), a source or a destination MAC (SMAC or DMAC) address, and/or a VLAN identifier. The match field may also include a priority associated with the entries in order to determine which action should be applied when multiple entries of the match field are met. When a match occurs with an entry in the match field, the instructions in the action field and a corresponding set of one or more entries in the table field are performed. Entries of the table field may include, for example, forwarding to an outgoing port (OutPort) and changing a destination MAC (DMAC) address to be placed in the packet.

Although FIG. 9 shows example components of environment portion 900, in other implementations, environment portion 900 may include fewer components, different components, differently arranged components, or additional components than depicted in FIG. 9. Alternatively, or additionally, one or more components of environment portion 900 may perform one or more other tasks described as being performed by one or more other components of environment portion 900. For example, MAT 955 may be implemented in operating system 920 and/or hypervisor 925.

Figure 10:
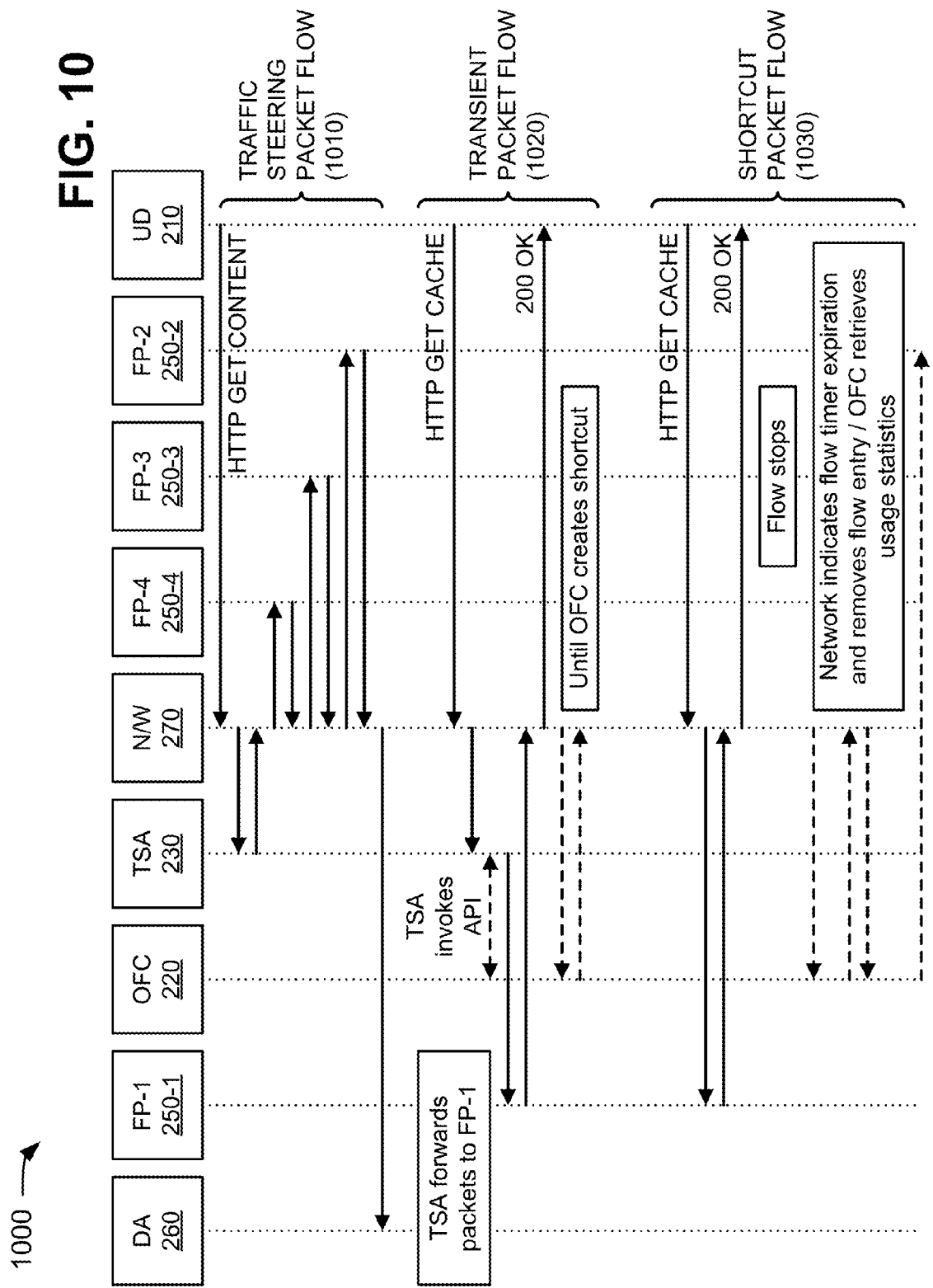
FIG. 10 is a flow diagram of example packet flows through an example portion of the environment depicted in FIG. 2.

FIG. 10 is a flow diagram of example packet flows through an example portion 1000 of environment 200 (FIG. 2). As shown in FIG. 10, environment portion 1000 may include user device 210, OFC 220, TSA 230, feature peers 250, destination address device 260, and network 270. User device 210, OFC 220, TSA 230, feature peers 250, destination address device 260, and network 270 may include the features described above in connection with one or more of, for example, FIGS. 1-9.

As further shown in FIG. 10, a first set of packet flows may be referred to as a traffic steering packet flow 1010. Traffic steering packet flow 1010 may correspond to the packet flow shown and described in connection with FIG. 8A. Traffic steering packet flow 1010 may include user device 210 providing packets to network 270, and network 270 providing the packets to TSA 230. TSA 230 may add tunnel/feature headers to the packets, and may forward the packets to network 270. Network 270 may forward the packets to feature peer 250-4, and feature peer 250-4 may process and return the packets to network 270. Network 270 may forward the packets to feature peer 250-3, and feature peer 250-3 may process and return the packets to network 270. Network 270 may forward the packets to feature peer 250-2, and feature peer 250-2 may process and return the packets to network 270. Network 270 may remove the tunnel/feature headers from the packets and forward the packets to destination address device 260. In one example, destination address device 260 may determine that features requested by the packets are available in feature peer 250-1. In response to the hypertext transfer protocol (HTTP) GET CONTENT message, destination address device 260 may generate a HTTP REDIRECT request (e.g., requesting that the packets be redirected to feature peer 250-1), and may provide the request to user device 210 via a path that is the reverse of the path traversed by the packets (not shown in FIG. 10).

Based on the REDIRECT request, a second set of packet flows, referred to as a transient packet flow 1020, may be generated. Transient packet flow 1020 may include user device 210 providing packets (e.g., a HTTP GET CACHE request) to network 270, and network 270 providing the packets to TSA 230. TSA 230 may invoke the API (e.g., API 620) with OFC 220, and may forward the packets to feature peer 250-1 based on communication with OFC 220. Feature peer 250-1 may process the packets, and may return the packets to network 270. Network 270 may forward the packets (e.g., a "200 OK" response) to user device 210. Network 270 and OFC 220 may exchange packets until OFC 220 creates a shortcut packet flow 1030.

A third set of packet flows may be referred to as shortcut packet flow 1030. Shortcut packet flow 1030 may correspond to the packet flow shown and described in connection with FIG. 7. Shortcut packet flow 1030 may include user device 210 providing packets (e.g., a HTTP GET request) to network 270, and network 270 providing the packets directly to feature peer 250-1 (e.g., rather than to TSA 230 as in transient packet flow 1020). Feature peer 250-1 may process the packets, and may return the packets to network 270. Network 270 may forward the packets (e.g., a "200 OK" response) to user device 210. When the packet flow stops, network 270 and OFC 220 may exchange packets. For example, network 270 may provide, to OFC 220, an indication that a flow timer has expired and that a flow entry has been removed. Based on the indication, OFC 220 may retrieve usage statistics from network 270, and may provide the usage statistics, via additional packets, to feature peer 250-2.

Although FIG. 10 shows example components of environment portion 1000, in other implementations, environment portion 1000 may include fewer components, different components, differently arranged components, or additional components than depicted in FIG. 10. Alternatively, or additionally, one or more components of environment portion 1000 may perform one or more other tasks described as being performed by one or more other components of environment portion 1000.

FIG. 11 is a diagram of example traffic steering packet flow operations capable of being performed by an example portion 1100 of environment 200 (FIG. 2). In one example, the traffic steering packet flow operations depicted in FIG. 11 may correspond to traffic steering packet flow 1010 (FIG. 10) and the packet flow shown and described in connection with FIG. 8A.

As shown in FIG. 11, environment portion 1100 may include user device 210, OFC 220, TSA 230, feature peers 250-2, 250-3, and 250-4, destination address device 260, network devices 275-1 and 275-2, TSA 905, operating system 910, security application 915, operating system 920, statistics collection application 930, operating system 935, content filtering application 940, operating system 945, and MAT 955. User device 210, OFC 220, TSA 230, feature peers 250-2, 250-3, and 250-4, destination address device 260, network devices 275-1 and 275-2, TSA 905, operating system 910, security application 915, operating system 920, statistics collection application 930, operating system 935, content filtering application 940, operating system 945, and MAT 955 may include the features described above in connection with one or more of, for example, FIGS. 1-10.

As further shown in FIG. 11, MAT 955 of network device 275-2 may include forwarding instructions 1110, and MAT 955 of network device 275-1 may include forwarding instructions 1120. A first row of forwarding instructions 1110 may include a high priority match on a wildcard IP destination address (DA=*) for packets received on incoming port 1 (InPort=1, FIG. 9), and an action to forward the packet. The table in the first row of forwarding instructions 1110 may include instructions to direct a packet (e.g., received from user device 210) to outgoing port 3 (OutPort=3, FIG. 9), change a destination MAC (DMAC) address to "a," and push a VLAN tag of "100," which may direct the packet to TSA 905. TSA 905 may process the packet, and may return the packet over port 3 to network device 275-2. The incoming port 3 (InPort=3), the VLAN tag (VLAN==100), and the SMAC address (SMAC=a) of the packet may match an entry in the second row of forwarding instructions 1110. The second row of forwarding instructions 1110 may include an action to forward the packet. The table in the second row of forwarding instructions 1110 may include instructions to direct the packet to outgoing port 3 (OutPort=3), change a DMAC address to "b," and push a VLAN tag of "100," which may forward the packet to security application 915. If security application 915 allows the packet to proceed, the packet may be forwarded on port 3 to network device 275-2. The packet from security application 915 may match the InPort=3, VLAN=100, SMAC=b entry in the third row of forwarding instructions 1110. Based on the match, network device 275-2 may forward the packet on outgoing port 2 (OutPort=2), which connects to network device 275-1.

Network device 275-1 may receive the packet, and may process the packets according to forwarding instructions 1120. The packet may match the InPort=2, VLAN=100, SMAC=b entry in the first row forwarding instructions 1120. Based on the match, network device 275-1 may direct the packet to outgoing port 3 (OutPort=3), change a DMAC address to "d," and push a VLAN tag of "100," which may forward the packet to content filtering application 940. If content filtering application 940 allows the packet to proceed, the packet may be sent on port 3 to network device 275-1. The packet may match the InPort=3, SMAC=d, VLAN=100 entry in the second row of forwarding instructions 1120. Based on the match, network device 275-1 may direct the packet to outgoing port 3 (OutPort=3), change a DMAC address to "c," and push a VLAN tag of "100," which may forward the packet to statistics collection application 930. Statistics collection application 930 may forward the packet to port 3 of network device 275-1. The packet may match the InPort=3, SMAC=c, and VLAN=100 entry in the third row of forwarding instructions 1120. Based on the match, network device 275-1 may direct the packet to outgoing port 1 (OutPort=1) and may remove the VLAN tag, which may forward the packet to destination address device 260. A similar process may be performed for the packet flow, in the direction from destination address device 260 to user device 210, as shown and described in connection with FIG. 8B.

Although FIG. 11 shows example components of environment portion 1100, in other implementations, environment portion 1100 may include fewer components, different components, differently arranged components, or additional components than depicted in FIG. 11. Alternatively, or additionally, one or more components of environment portion 1100 may perform one or more other tasks described as being performed by one or more other components of environment portion 1100.

FIG. 12 is a diagram of example transient packet flow operations capable of being performed by an example portion 1200 of environment 200 (FIG. 2). The operations depicted in FIG. 12 may be transient in a sense that TSA 230 may recognize a need to modify the service graph to a target state, but may not have issued commands to network devices 275 and/or feature peers 250. In one example, the transient packet flow operations depicted in FIG. 12 may correspond to transient packet flow 1020 (FIG. 10).

As shown in FIG. 12, environment portion 1200 may include user device 210, OFC 220, TSA 230, feature peers 250-2, 250-3, and 250-4, destination address device 260, network devices 275-1 and 275-2, TSA 905, operating system 910, security application 915, operating system 920, statistics collection application 930, operating system 935, content filtering application 940, operating system 945, and MAT 955. User device 210, OFC 220, TSA 230, feature peers 250-2, 250-3, and 250-4, destination address device 260, network devices 275-1 and 275-2, TSA 905, operating system 910, security application 915, operating system 920, statistics collection application 930, operating system 935, content filtering application 940, operating system 945, and MAT 955 may include the features described above in connection with one or more of, for example, FIGS. 1-11.

As further shown in FIG. 12, MAT 955 of network device 275-2 may include forwarding instructions 1210, and MAT 955 of network device 275-1 may include forwarding instructions 1220. A first row of forwarding instructions 1210 may include a high priority match on a wildcard IP destination address (DA=*) for packets received on incoming port 1 (InPort=1, FIG. 9), and an action to forward the packet. The table in the first row of forwarding instructions 1210 may include instructions to direct a packet (e.g., received from user device 210) to outgoing port 3 (OutPort=3), change a destination MAC (DMAC) address to "a," and push a VLAN tag of "100," which may direct the packet to TSA 905. TSA 905 may direct the packet to a cache when a cache hit is detected. TSA 905 may send a message, over API 620 between TSA 230 and OFC 220 (FIG. 6), requesting that OFC 220 set up a "shortcut" packet flow to the cache server, as shown in FIG. 7. A second row of forwarding instructions 1210 may include a match on InPort=3 and DA=OFC, and an action to forward the packet. The table in the second row of forwarding instructions 1210 may include instructions to direct the packet to outgoing port 4 (OutPort=4), which may direct the packet from TSA 905 to OFC 220. OFC 220 may receive the packet and may send the packet to network device 275-1.

The packet may match the InPort=4, DA=Cache entry in the third row of forwarding instructions 1220. Based on the match, network device 275-1 may forward the packet on outgoing port 2 (OutPort=2) and may push a VLAN tag of "200," which may direct the packet to a cache server (not shown, but connected to port 4, FIG. 9). The cache server may return the packet with a prefix corresponding to port 4 of network device 275-1. The packet may match the InPort=4, VLAN=200 entry in the second row of forwarding instructions 1220. Based on the match, network device 275-1 may forward the packet on outgoing port 2 (OutPort=2) and may remove the VLAN tag, which may direct the packet to network device 275-2. The packet may match the InPort=2, DA=Customer Prefix entry in the third row of forwarding instructions 1210. Based on the match, network device 275-2 may forward the packet on outgoing port 1 (OutPort=1). This process may continue until OFC 220 creates a "shortcut" flow entry, which may result in the shortcut packet flow shown and described in connection with FIG. 7 and FIG. 13 (below).

Although FIG. 12 shows example components of environment portion 1200, in other implementations, environment portion 1200 may include fewer components, different components, differently arranged components, or additional components than depicted in FIG. 12. Alternatively, or additionally, one or more components of environment portion 1200 may perform one or more other tasks described as being performed by one or more other components of environment portion 1200.

Figure 13:
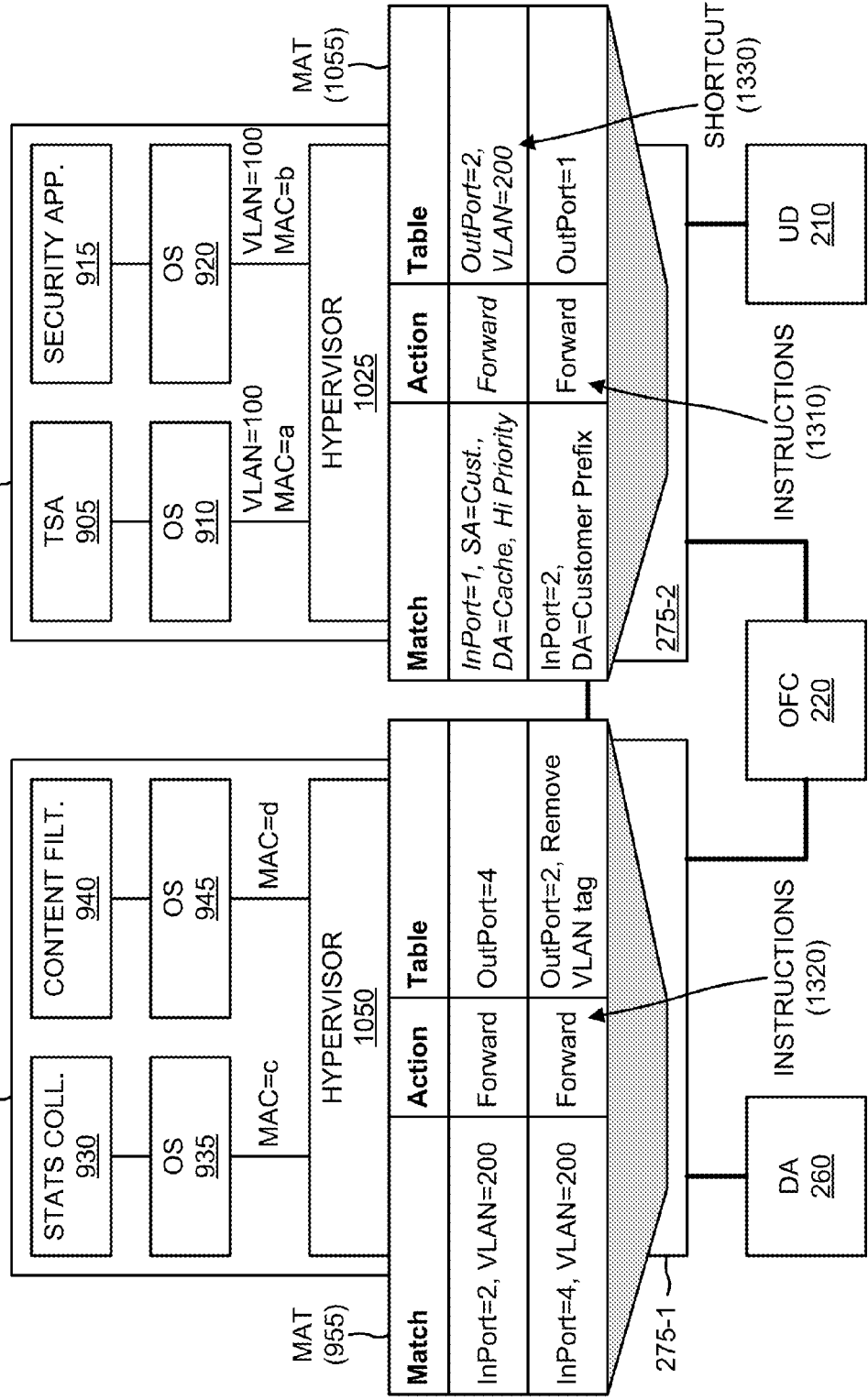
FIG. 13 is a diagram of example shortcut packet flow operations capable of being performed by an example portion of the environment illustrated in FIG. 2.

FIG. 13 is a diagram of example shortcut packet flow operations capable of being performed by an example portion 1300 of environment 200 (FIG. 2). In one example, the shortcut packet flow operations depicted in FIG. 13 may correspond to shortcut packet flow 1030 (FIG. 10) and the packet flow shown and described in connection with FIG. 7.

As shown in FIG. 13, environment portion 1300 may include user device 210, OFC 220, TSA 230, feature peers 250-2, 250-3, and 250-4, destination address device 260, network devices 275-1 and 275-2, TSA 905, operating system 910, security application 915, operating system 920, statistics collection application 930, operating system 935, content filtering application 940, operating system 945, and MAT 955. User device 210, OFC 220, TSA 230, feature peers 250-2, 250-3, and 250-4, destination address device 260, network devices 275-1 and 275-2, TSA 905, operating system 910, security application 915, operating system 920, statistics collection application 930, operating system 935, content filtering application 940, operating system 945, and MAT 955 may include the features described above in connection with one or more of, for example, FIGS. 1-12.

As further shown in FIG. 13, MAT 955 of network device 275-2 may include forwarding instructions 1310, and MAT 955 of network device 275-1 may include forwarding instructions 1320. A first row of forwarding instructions 1310 may include entries for a shortcut packet flow 1330. Shortcut packet flow 1330 may include a match entry (InPort=1, SA=Customer, DA=Cache), an action entry (e.g., forward a packet), and a table entry (OutPort=2, VLAN=200). The remaining entries of forwarding instructions 1310 and forwarding instructions 1320 may be the same as the entries of forwarding instructions 1110/1210 and forwarding instructions 1120/1220, respectively. Shortcut packet flow 1330 may enable flow-specific usage counters to be collected, and a flow expiration to be detected.

Based on shortcut packet flow 1330, packets from user device 210 may be directed from user device 210 to a cache server (e.g., feature peer 250-1) and back to user device 210, and may bypass other feature peers 250. In this example, a termination of the packet flow may be determined when a network device 275, located at a user device-facing edge of network 270, detects that shortcut packet flow 1330 has timed out. At this point, shortcut packet flow 1330 may be removed from forwarding instructions 1310. For packets not addressed to DA=Cache, the packet flow described above in connection with FIG. 6 may be utilized. If a packet is addressed to DA=Cache, the transient packet flow (FIG. 12) may be utilized until OFC 220 creates the shortcut packet flow.

Although FIG. 13 shows example components of environment portion 1300, in other implementations, environment portion 1300 may include fewer components, different components, differently arranged components, or additional components than depicted in FIG. 13. Alternatively, or additionally, one or more components of environment portion 1300 may perform one or more other tasks described as being performed by one or more other components of environment portion 1300.

Figure 14:
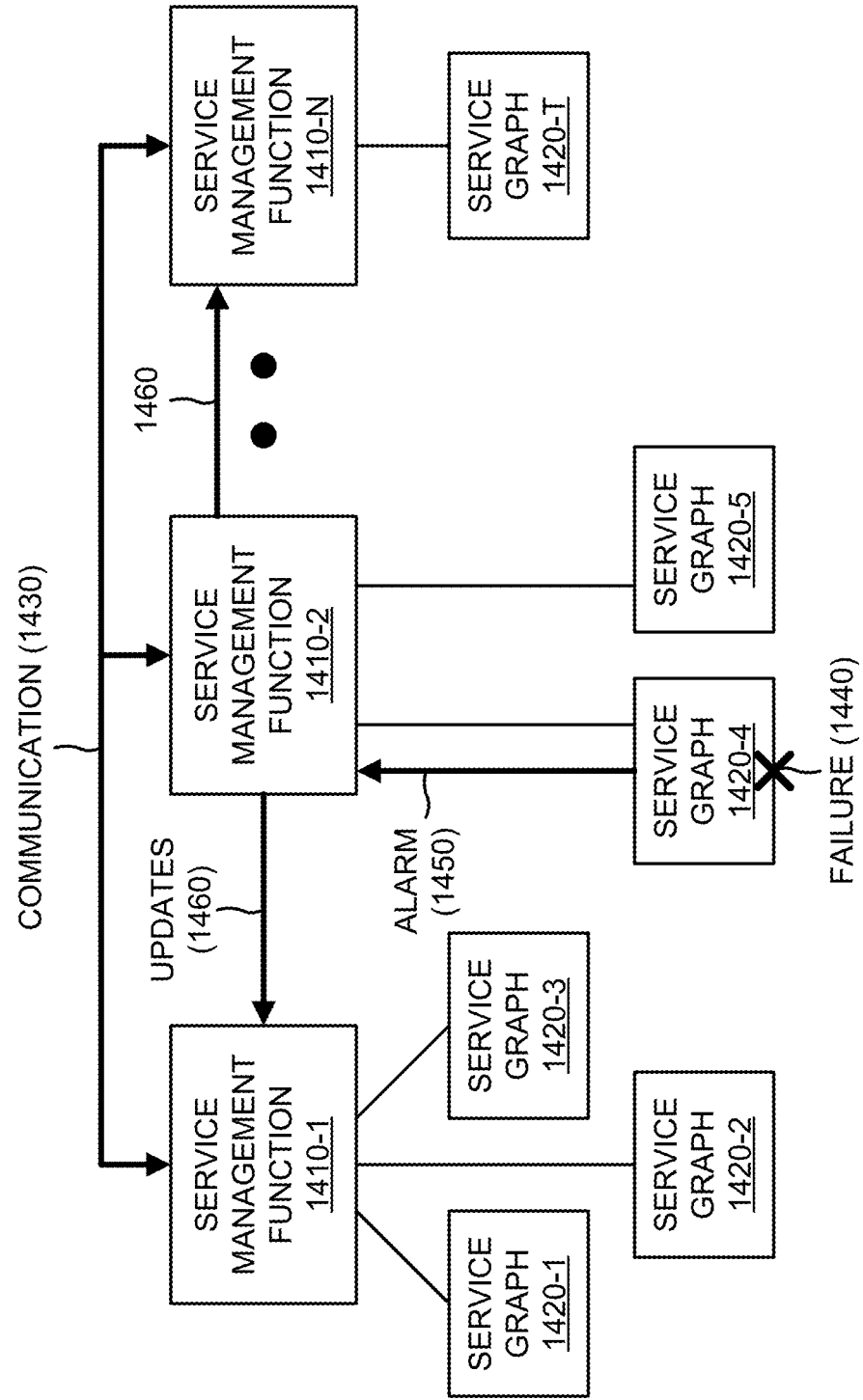
FIG. 14 is a diagram of example functional components of a service manager depicted in FIG. 2.

FIG. 14 is a diagram of example functional components of service manager 290. In one example, the functions described in connection with FIG. 14 may be performed by one or more components of device 300 (FIG. 3) and/or by one or more devices 300. As shown in FIG. 14, service manager 290 may include multiple service management functions 1410-1 through 1410-N (collectively referred to herein as "service management functions 1410," and, in some instances, individually as "service management function 1410"). Each service management function 1410 may be associated with one or more service graphs 1420-1 through 1410-T (collectively referred to herein as "service graphs 1420," and, in some instances, individually as "service graph 1420").

Service management function 1410 may support and/or manage one or more service graphs 1420, which may be communicated to TSA 230. Service graph 1420 may include the features of the service graphs described herein in connection with one or more of FIGS. 5A-8B.

Centralized service management of a large number of feature peers 250, service graphs, and link-level connectivity may not meet restoration time objectives for some service availability contracts. In one example implementation, restoration time objectives may be met by partitioning the service management into service management functions 1410 that interact with each other. Partitioning the service management may occur at multiple levels. At one level, a service management function 1410 may be provided for each feature peer 250. Since a least cost resource assignment may assign feature peers 250 and link-level connectivity to resources in close proximity, partitioning the service management at this level may cause feature peers 250 and link-level connectivity to be assigned to the same service management function 1410. Service management partitioning may occur by resource type class, and grouping by fungible resource types may maximize scalability.

Each service graph 1420 may be supported by a particular service management function 1410 ($SM_j$), and a union (or some other combination) ($U_j$) of all service management functions 1410 may constitute the service management (SM) (e.g., $SM=U_j (SM_j)$). Each service management function 1410 ($SM_j$) may be aware of its own managed set of service graphs 1420 ($\{G_S\}_j$). A complete service graph 1420 (G) may be expressed as $G=U_j\{G_S\}_j$. Each service management function 1410 ($SM_j$) may also maintain its own copy of the complete service graph (G).

Each service management function 1410 ($SM_j$) may communicate with every other service management function 1410 ($SM_j$), as indicated by reference number 1430. Communication 1430 may enable service management functions 1410 to exchange feature peer state information, using a peer-to-peer (P2P) protocol or some other distributed database protocol. Based on communications 1430 and information received from service manager 290, each service management function 1410 ($SM_j$) may maintain an updated copy of service graphs 1420 ($\{G_S\}_j$), as well as complete service graph 1420 (G).

If a failure 1440 occurs in one of service graphs 1420, an alarm 1450 may be provided to a service management function 1410 supporting the failed service graph 1420. For example, one or more feature peers 250 in service graph 1420-4 may fail, which may cause service graph 1420-4 to provide alarm 1450 to service management function 1410-2. Alarm 1450 may include information indicating that some feature peer(s) 250 within service graph 1420-4 can no longer perform a service function. In one example, service management function 1410-2 may provide alarm 1450 to the other service management functions 1410. Alternatively, or additionally, service management function 1410-2 may provide updates 1460 to other service management functions 1410 deemed to be relevant (e.g., affected by failure 1440).

To determine relevant other service management functions 1410, service management function 1410-2 may examine a copy of service graph 1420-4 containing failure 1440 in one or more feature peers 250. Service management function 1410-2 may derive a set of service subgraphs ($\{G's\}_k \subset \{G_S\}_k$) by examining the alarmed feature peers 250 within service graph 1420-4, and may identify equivalent or backup feature peers 250 for the alarmed feature peers 250. The backup feature peers 250 may or may not be managed by service management function 1410-2. Service management function 1410-2 may send (e.g., via updates 1460), to other service management functions 1410 that manage each backup feature peer 250, a modified service graph 1420-4 that includes the backup feature peers 250.

A service management function 1410 receiving the modified service graph 1420-4 may modify its copy of service graph 1420-4, to exclude the alarmed feature peers 250, and may maintain the modified service graph 1420-4. A service management function 1410 receiving the modified service graph 1420-4 may provide the modified service graph 1420-4 to one or more other service management functions 1410.

Each service graph 1420 may include a distinct approach to maintaining state information, accessing/writing data, using auxiliary services, etc. Feature peers 250, of a service graph 1420, which require resources from other feature peers 250 may be ensured that the other feature peers 250 are available. If a service graph 1420 requires a one-hundred percent availability, customers may be routed to backup feature peers 250, in the event of failure, without disrupting a service. In one example, service management function 1410-2 may notify all customers using the failed feature peers 250, and may instruct the customers to choose another service graph from a list of service graphs that is ordered based on proximity to the customers.

Although FIG. 14 shows example functional components of service manager 290, in other implementations, service manager 290 may include fewer functional components, different functional components, differently arranged functional components, or additional functional components than depicted in FIG. 14. Alternatively, or additionally, one or more functional components of service manager 290 may perform one or more other tasks described as being performed by one or more other functional components of service manager 290.

Figure 15:
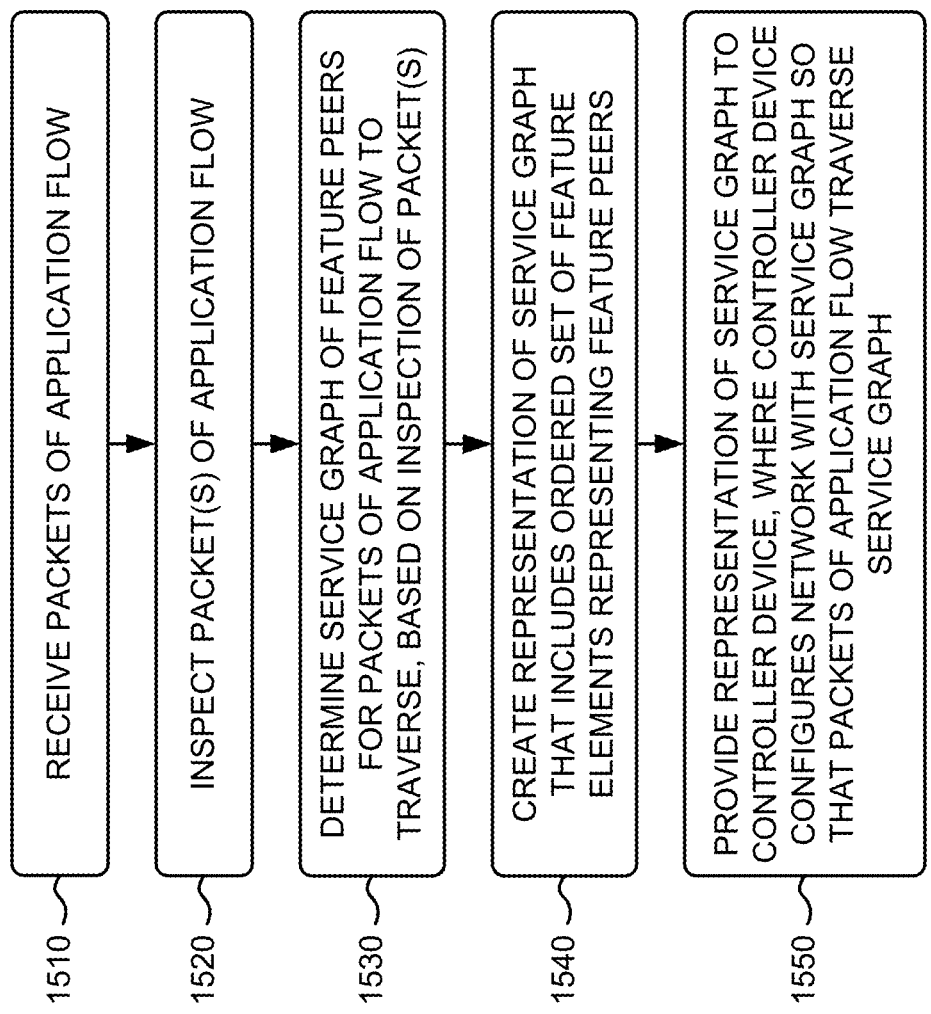
FIG. 15 is a flow chart of an example process for creating a representation of a feature peer network.

FIG. 15 is a flow chart of an example process 1500 for creating a representation of a feature peer network. In one implementation, process 1500 may be performed by TSA 230. Alternatively, or additionally, some or all of process 1500 may be performed by another device or group of devices, including or excluding TSA 230.

As shown in FIG. 15, process 1500 may include receiving packets of an application flow (block 1510), and inspecting one or more packets of the application flow (block 1520). For example, in an implementation described above in connection with FIG. 5A, a customer, associated with user device 210, may wish to provide packets 510 of an application flow to destination address device 260. In one example, packets 510 may need to traverse one or more feature peers 250 before being provided to destination address device 260. TSA 230 may consult with AAA 240 and/or may inspect one or more packets 510 of the application flow.

As further shown in FIG. 15, process 1500 may include determining a service graph of feature peers for the packets of the application flow to traverse, based on the inspection of the packet(s) (block 1530), and creating a representation of the service graph that includes an ordered set of feature elements representing the feature peers (block 1540). For example, in an implementation described above in connection with FIG. 5A, TSA 230 may consult with AAA 240 and/or may inspect one or more packets 510 of the application flow to determine a service graph for packets 510 of the application flow. TSA 230 may create representation 520, of the service graph, that includes an ordered set of feature elements that represent feature peers 250. The feature elements may include generic notations for feature peers (e.g., $f_{1,s}$, where the "1" may be a feature peer identifier and "s" may be a specific service graph "s"); packet ingress points (e.g., $i_s$, where "s" may be the specific service graph); packet egress points (e.g., $e_s$, where "s" may be the specific service graph); and data sources/sinks (e.g., $d_{1,s}$, where the "1" may be a data source identifier and "s" may be the specific service graph).

Returning to FIG. 15, process 1500 may include providing the representation of the service graph to a controller device, where the controller device configures a network with the service graph so that the packets of the application flow traverse the service graph (block 1550). For example, in an implementation described above in connection with FIG. 5A, TSA 230 may provide service graph representation 520 to OFC 220, and OFC 220 may receive and store service graph representation 520. In one example, OFC 220 may configure network devices 275 in network 270 to implement service graph representation 520, as indicated by reference number 530. For example, OFC 220 may generate and provide forwarding instructions to network devices 275. The forwarding instructions may include instructions that instruct network devices 275 to implement a service graph 540 based on service graph representation 520. Based on the forwarding instructions, network devices 275 may forward packets 510 of the application flow to the fourth feature peer 250-4, the third feature peer 250-3, the second feature peer 250-2, and finally to destination address device 260.

Figure 16:
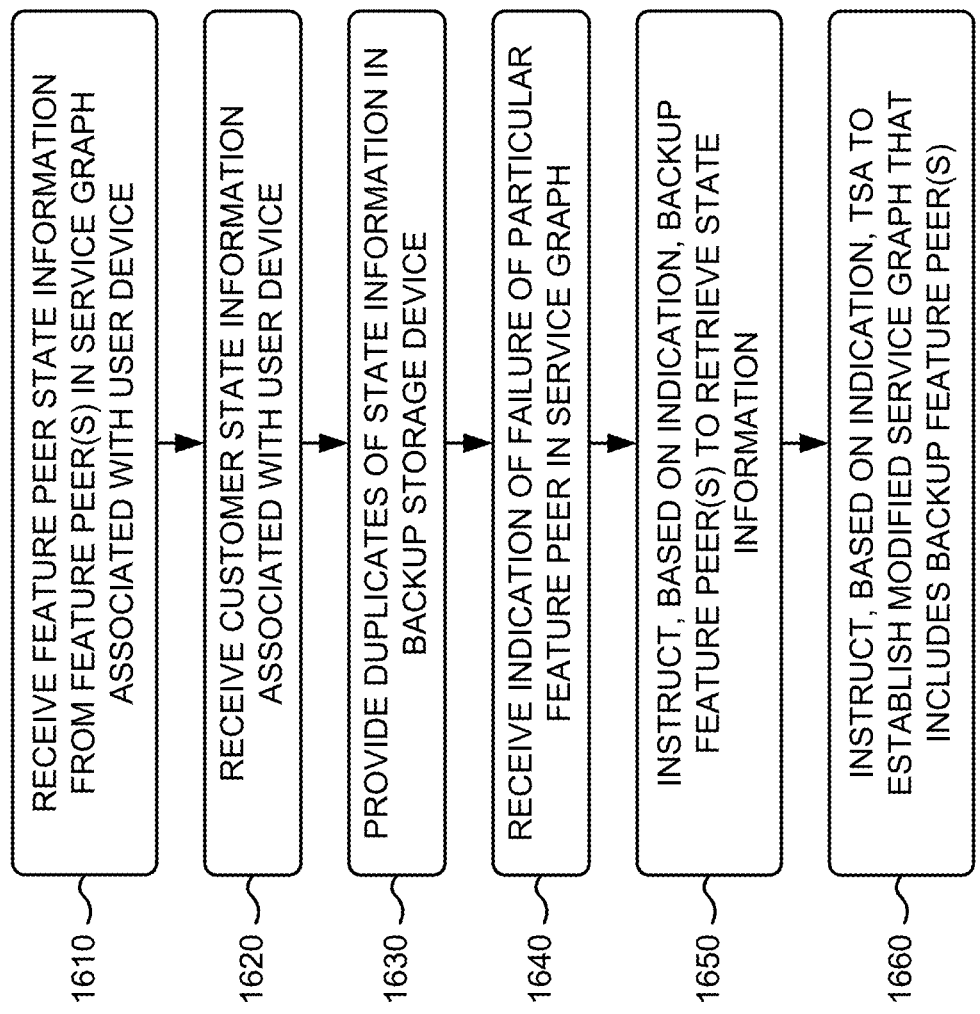
FIG. 16 is a flow chart of an example process for providing scalable state information associated with a feature peer network.

FIG. 16 is a flow chart of an example process 1600 for providing scalable state information associated with a feature peer network. In one implementation, process 1600 may be performed by NAS 280. Alternatively, or additionally, some or all of process 1600 may be performed by another device or group of devices, including or excluding NAS 280.

As shown in FIG. 16, process 1600 may include receiving feature peer state information from feature peer(s) in a service graph associated with a user device (block 1610), and receiving packets with customer state information associated with the user device (block 1620). For example, in an implementation described above in connection with FIG. 5B, as the packets of the application flow traverse feature peers 250-2, 250-3, and 250-4 of service graph 540, feature peers 250-2, 250-3, and 250-4 may provide feature peer state information 550 to NAS 280. Feature peer state information 550 may include information generated by feature peers 250-2, 250-3, and 250-4 during the processing of the packets of the application flow. NAS 280 may receive and store feature peer state information 550. As the packets of the application flow traverse feature peers 250-2, 250-3, and 250-4 of service graph 540, service manager 290 may receive customer state information 560 from user device 210. Service manager 290 may provide customer state information 560 to NAS 280. Customer state information 560 may include information generated by user device 210 during the processing of the packets of the application flow. NAS 280 may receive and store customer state information 560.

As further shown in FIG. 16, process 1600 may include providing duplicates of the state information in a backup storage device (block 1630), and receiving an indication of a failure of a particular feature peer in the service graph (block 1640). For example, in arm implementation described above in connection with FIG. 5B, NAS 280 may replicate, in backup NAS 280 and as indicated by reference number 570, feature peer state information 550 and/or customer state information 560. For example, the NAS 280 may provide duplicates of feature peer state information 550 and/or customer state information 560 to backup NAS 280. The third feature peer 250-3 may experience failure 580 or inoperability that may prevent feature peer 250-3 from processing the packets of the application flow. Service manager 290 may detect failure 580 (e.g., via signaling, or lack thereof, provided by feature peer 250-3), as indicated by reference number 590.

Returning to FIG. 16, process 1600 may include instructing, based on the indication, backup feature peer(s) to retrieve state information (block 1650), and instructing, based on the indication, a TSA to establish a modified service graph that includes the backup feature peer(s) (block 166). For example, in arm implementation described above in connection with FIG. 5B, based on the failure 580, service manager 290 may select a backup feature peer (e.g., backup feature peer 250-3) from a pool of backup feature peers 250, and may provide, to backup feature peer 250-3, information (e.g., feature logic) that enables backup feature peer 250-3 to provide the features of the failed feature peer (e.g., the third feature peer 250-3). Service manager 290 may instruct backup feature peer 250-3 to retrieve state information, for the failed feature peer, from NAS, as indicated by reference number 590. Service manager 290 may instruct TSA 230 and OFC 220 to modify original service graph 540 to exclude the failed feature peer (e.g., the third feature peer 250-3) and to include the newly instantiated backup feature peer 250-3. TSA 230 may create a representation, of a modified service graph 594, that includes an ordered set of feature elements that represent the feature peers. TSA 230 may provide the modified service graph representation to OFC 220, and OFC 220 may configure, based on the representation, network 270 with modified service graph 594 so that the packets of the application flow traverse modified service graph 594.

FIG. 17 is a flow chart of an example process 1700 for providing scalable management of a feature peer network. In one implementation, process 1700 may be performed by service manager 290. Alternatively, or additionally, some or all of process 1700 may be performed by another device or group of devices, including or excluding service manager 290.

As shown in FIG. 17, process 1700 may include establishing service management functions that support multiple service graphs, each service graph including an ordered set of feature peers (block 1710), and enabling the service management functions to communicate with each other (block 1720). For example, in an implementation described above in connection with FIG. 14, each of service management functions 1410, of service manager 290, may support and/or manage one or more service graphs 1420. Service graph 1420 may include the features of the service graphs described herein. Each service management function 1410 ($SM_j$) may communicate with every other service management function 1410 ($SM_j$), as indicated by reference number 1430. Communication 1430 may enable service management functions 1410 to exchange feature peer state information, using a peer-to-peer (P2P) protocol or some other distributed database protocol.

As further shown in FIG. 17, process 1700 may include receiving, at a particular service management function, an indication of a failure of a particular feature peer of a particular service graph (block 1730), and identifying, based on the indication, a backup feature peer for the particular feature peer in order to create a modified service graph (block 1740). For example, in an implementation described above in connection with FIG. 14, if failure 1440 occurs in one of service graphs 1420, alarm 1450 may be provided to a service management function 1410 supporting the failed service graph 1420. Alarm 1450 may include information indicating that some feature peer(s) 250 within service graph 1420-4 can no longer perform a service function and/or that feature peer(s) 250 are not reachable by network devices 275. In one example, service management function 1410-2 may provide alarm 1450 to the other service management functions 1410. Alternatively, or additionally, service management function 1410-2 may provide updates 1460 to other service management functions 1410 deemed to be relevant (e.g., affected by failure 1440). Service management function 1410-2 may derive a set of service subgraphs ($\{G'_S\}_k \subset \{G_S\}_k$) by examining the alarmed feature peers 250 within service graph 1420-4, and may identify equivalent or backup feature peers 250 for the alarmed feature peers 250. The backup feature peers 250 may or may be managed by service management function 1410-2.

Returning to FIG. 17, process 1700 may include providing the modified service graph to the other service management functions, where the other service management functions implement the modified service graph (block 1750). For example, in an implementation described above in connection with FIG. 14, service management function 1410-2 may send (e.g., via updates 1460), to other service management functions 1410 that manage each backup feature peer 250, a modified service graph 1420-4 that includes the backup feature peers 250. A service management function 1410 receiving the modified service graph 1420-4 may modify its copy of service graph 1420-4, to exclude the alarmed feature peers 250, and may maintain the modified service graph 1420-4. A service management function 1410 receiving the modified service graph 1420-4 may provide the modified service graph 1420-4 to one or more other service management functions 1410.

Systems and/or methods described herein may enable forwarding of packets of an application flow between an ordered set of feature peers (e.g., a service graph) in a more efficient manner than traditional load balancer, access router, and/or traffic steering application methods. The systems and/or methods may determine the service graph of feature peers based on inspection of the packets, and may utilize a protocol to configure network devices of a network with the service graph. The network devices may forward the packets of the application flow to the feature peers, based on the service graph and without changing the application flow. The systems and/or methods may create representations of the service graph, and may share state information, associated with the feature peers, with other feature peers so that a redundant or backup service graph may be created with the other feature peers.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 15-17, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the implementations unless explicitly described as such. Also, as used herein, the articles "a" and "an" are intended to include one or more items and may be used interchangeably with "one or more," Where only one item is intended, the term "one" or similar language is used. Further, the phrase "based on" is intended to mean "based, at least in part, on" unless explicitly stated otherwise.

What is claimed is:
1. A method, comprising:
   receiving, by a device, packets of an application flow;
   inspecting, by the device, one or more of the packets of the application flow;
   determining, by the device and based on inspecting the one or more packets, a service graph of feature peers for the packets of the application flow,
      the feature peers being associated with a network;
   creating, by the device, a representation of the service graph,
      the representation of the service graph including an ordered set that includes a first notation for an ingress point of the packets, second notations for the feature peers, and a third notation for an egress point of the packets;
   providing, by the device, the representation of the service graph to a controller device,
      the controller device configuring, based on the representation of the service graph, the network with the service graph so that the packets of the application flow traverse the service graph;
   identifying, by the device, a failure of a particular feature peer of the feature peers;
   identifying, by the device, a backup feature peer for the particular feature peer;
   modifying, by the device, the service graph to obtain a modified service graph that includes the backup feature peer and excludes the particular feature peer; and
   creating, by the device, a representation of the modified service graph,
      the representation of the modified graph including the first notation for the ingress point of the packets, one or more of the second notations for one or more of the feature peers, a fourth notation for the backup feature peer, and the third notation for the egress point of the packets, and the one or more of the feature peers not including the particular feature peer.

2. The method of claim 1, where the representation of the service graph is in a set style format or a shorthand notation format.

3. The method of claim 1, where the service graph defines a path via the feature peers.

4. The method of claim 1, where each of the feature peers provides one or more of:
content-related services,
security-related services,
quality of service (QoS)-related services,
accounting-related services,
administrative-related services, or
proxy-related services.

5. The method of claim 1, further comprising:
establishing a particular service management function that manages and supports one or more service graphs; and
enabling the particular service management function to communicate with other service management functions.

6. The method of claim 5, further comprising:
providing the modified service graph to the other service management functions,
the other service management functions implementing the modified service graph.

7. A device, comprising:
one or more processors to:
receive packets of an application flow,
inspect one or more of the packets of the application flow,
determine, based on inspecting the one or more packets, a service graph of feature peers for the packets of the application flow,
the feature peers being associated with a network,
create a representation of the service graph,
the representation of the service graph including an ordered set that includes a first notation for an ingress point of the packets, second notations for the feature peers, and a third notation for an egress point of the packets,
provide the representation of the service graph to a controller device,
the controller device configuring, based on the representation, the network with the service graph so that the packets of the application flow traverse the service graph,
receive, from another device, instructions to establish a modified service graph that excludes
a failed feature peer of, the feature peers and includes a backup feature peer for the failed feature peer,
modify, based on the instructions, the service graph to obtain a modified service graph that includes the backup feature peer and excludes the failed feature peer, and
create a representation of the modified service graph,
the representation of the modified graph including the first notation for the ingress point of the packets, one or more of the second notations for one or more of the feature peers, a fourth notation for the backup feature peer, and the third notation for the egress point of the packets, and
the one or more of the feature peers not including the failed feature peer.

8. The device of claim 7, where the representation of the service graph is in a set style format or a shorthand notation format.

9. The device of claim 7, where the service graph defines a path via the of feature peers.

10. The device of claim 7, where each of the feature peers provides one or more of:
content-related services,
security-related services,
quality of service (QoS)-related services,
accounting-related services,
administrative-related services, or
proxy-related services.

11. The device of claim 7, where the one or more processors are further to:
establish a service management function that manages and supports one or more service graphs, and
enable the service management function to communicate with other service management functions.

12. The device of claim 11, where the one or more processors are further to:
provide the modified service graph to service management functions that implement the modified service graph.

13. A method, comprising:
receiving, by a device, feature peer state information,
the feature peer state information being received from a set of feature peers in a service graph associated with a user device of a customer;
receiving, by the device, customer state information,
the customer state information being generated by the user device;
receiving, by the device, an indication of a failure of a particular feature peer in the service graph;
instructing, by the device and based on the indication, a backup feature peer to retrieve the feature peer state information and the customer state information; and
instructing, by the device and based on the indication, a traffic steering application (TSA) to establish a modified service graph that includes the backup feature peer and excludes the particular feature peer,
the TSA being implemented on one or more other devices, and
the one or more other devices being separate from the device.

14. The method of claim 13, further comprising:
instructing the backup feature peer to retrieve duplicates of the feature peer state information and the customer state information from a backup storage device.

15. The method of claim 13, where the modified service graph defines a path via the backup feature peer and the set of feature peers excluding the particular feature peer.

16. The method of claim 13, where each of the feature peers and the backup feature peer provides one or more of:
content-related services,
security-related services,
quality of service (QoS)-related services,
accounting-related services,
administrative-related services, or
proxy-related services.

17. The method of claim 13, where the feature peer state information includes information generated by the set of feature peers during processing of an application flow generated by the user device.

18. The method of claim 13, where the customer state information includes information generated by the user device during processing of an application flow generated by the user device.

19. A device, comprising:
one or more processors to:
- receive feature peer state information from a set of feature peers in a service graph associated with a user device of a customer,
- receive customer state information generated by the user device,
- provide duplicates of the feature peer state information and the customer state information in a backup storage device,
- receive an indication of a failure of a particular feature peer in the service graph,
- instruct, based on the indication, a backup feature peer to retrieve the feature peer state information and the customer state information, and
- instruct, based on the indication, a traffic steering application (TSA) to establish a modified service graph that includes the backup feature peer and excludes the particular feature peer,
    - the TSA being implemented on one or more other devices, and
    - the one or more other devices being separate from the device.

20. The device of claim 19, where the modified service graph defines a path via the backup feature peer and the set of feature peers excluding the particular feature peer.

21. The device of claim 19, where each of the feature peers and the backup feature peer provides one or more of:
- content-related services,
- security-related services,
- quality of service (QoS)-related services,
- accounting-related services,
- administrative-related services, or
- proxy-related services.

22. The device of claim 19, where:
- the feature peer state information includes information generated by the set of feature peers during processing of an application flow generated by the user device, and
- the customer state information includes information generated by the user device during processing of the application flow.

* * * * *